United States Patent
Tompkins et al.

(10) Patent No.: US 6,670,291 B1
(45) Date of Patent: Dec. 30, 2003

(54) LAMINATE SHEET MATERIAL FOR FIRE BARRIER APPLICATIONS

(75) Inventors: Thomas L. Tompkins, Woodbury, MN (US); Margaret M. Vogel-Martin, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 09/691,575

(22) Filed: Oct. 18, 2000

(51) Int. Cl.[7] .................. B32B 27/04; B32B 27/12; B32B 5/02; B32B 15/00; B32B 9/00
(52) U.S. Cl. .................. 442/136; 442/146; 442/1; 442/43; 442/45; 428/332; 428/339; 428/340; 428/379; 428/384; 428/920; 428/921
(58) Field of Search .................. 442/136, 146, 442/1, 43, 45; 428/332, 339, 340, 379, 384, 920, 921

(56) References Cited

U.S. PATENT DOCUMENTS

| | | | |
|---|---|---|---|
| 3,567,162 A | * | 3/1971 | Lea .................. 244/121 |
| 3,795,524 A | | 3/1974 | Sowman |
| 4,047,965 A | | 9/1977 | Karst et al. |
| 4,255,483 A | * | 3/1981 | Byrd et al. .................. 428/245 |
| 4,868,050 A | | 9/1989 | Tanaka et al. |
| 4,954,462 A | | 9/1990 | Wood et al. |
| 5,030,518 A | | 7/1991 | Keller |
| 5,126,013 A | | 6/1992 | Wiker et al. |
| 5,167,876 A | | 12/1992 | Lem et al. |
| 5,462,797 A | | 10/1995 | Williams et al. |
| 5,595,817 A | | 1/1997 | Schafer et al. |
| 5,654,063 A | * | 8/1997 | Kirk et al. .................. 428/77 |
| 5,705,444 A | | 1/1998 | Tompkins et al. |
| 5,759,659 A | | 6/1998 | Sanocki et al. |
| 5,955,177 A | | 9/1999 | Sanocki et al. |
| 6,551,951 B1 | | 4/2003 | Fay et al. |

FOREIGN PATENT DOCUMENTS

| | | |
|---|---|---|
| EP | 0 203 129 B1 | 11/1985 |
| EP | 0 736 373 A1 | 10/1996 |

OTHER PUBLICATIONS

See, e.g., Department of Transportation, Federal Aviation Administration, "Improved Flammability Standards for Thermal/Acoustic Insulation Material Used in Transport Category Airplanes; Proposed Rule", 14 CFR Part 25, et al., vol. 65, No. 183, Sep. 20, 2000, pp. 56992–57022.

"Handbook of Fillers and Reinforcements for Plastic", Katz et al., Van Norstand Reinhold Co., Chapters 13, 14 & 15, pp. 219–274, 1978.

3M Brochure "NEXTEL™ Flame Stopping Dot Paper", 2000.

"Standard Test Method for Critical Radiant Flux of Floor-Covering Systems Using a Radiant Heat Energy Source", ASTM Designation E 648–99, p. 670–683.

* cited by examiner

*Primary Examiner*—Elizabeth M. Cole
*Assistant Examiner*—Jeremy R. Pierce
(74) *Attorney, Agent, or Firm*—Gregory D. Allen

(57) ABSTRACT

A laminate sheet material comprising a first layer comprised of polymeric material and a second layer comprised of non-metallic fibers. The first and second layers at least collectively contribute to the laminate having at least one of a passing Flammability Value, Flame Propagation Value or Burnthrough Value. The laminate sheet material is useful, for example, in vehicles (e.g., aircraft), insulation blankets, insulation systems, and systems for limiting exposure of flammable insulation to an ignition source.

53 Claims, 11 Drawing Sheets

LAMINATE SHEET MATERIAL FOR FIRE BARRIER APPLICATIONS

FIELD OF THE INVENTION

The present invention relates to laminate sheet materials. The laminate sheet materials are useful, for example, for fire barrier applications on vehicles such as aircraft.

BACKGROUND OF THE INVENTION

There are a variety of situations where it is necessary or desirable to utilize a barrier to prevent or reduce the transfer of heat and/or flame. For example, the fuselage of an aircraft generally includes a metal outer skin supported around a metal frame comprising a stringer and circumferential members. Since temperatures within the fuselage must usually be controlled in order to insure the proper environment for occupants and cargo, most fuselage shells also include some form of thermal insulation. Insulation is generally included for acoustical reasons as well. In many aircraft this insulation takes the form of fiberglass batts supported by the stringer and circumferential members.

The fiberglass is generally encased in a film bagging material to protect the fiberglass from condensate and other fluids the insulation might come into contact with. Bagging materials that have been used for such a purpose include metallized polyester, plain polyester, metallized polyvinyl fluoride, and polyimide.

In 2000, the FAA (i.e., the United States Federal Aviation Administration) issued notice of proposed rule making detailing new test methods for thermal/acoustic insulation intended to increase in-flight fire safety and post-crash burn-through resistance of insulation materials on aircraft. The FAA published an Airworthiness Directive requiring operators of hundreds of aircraft to replace insulation blankets covered with metallized polyester within the next four years. Replacement materials are to meet the FAA's new in-flight fire protection test, which is based on the American Society for Testing, and Materials test designated as ASTM E 648-97, Mar. 10, 1999. The disclosure of which is incorporated herein by reference. The FAA has drafted a proposed requirement that would mandate both enhanced in-flight fire resistance and post-crash burn through protection (see, e.g., Department of Transportation, Federal Aviatioin Administration, Improved Flammability Standards for Thermal/Acoustic Insulation Materials Used in Transport Category Airplanes; Proposed Rule, 14 CFM Part 25, et al., Federal Register, Vol. 65, No. 183, Wednesday, Sep. 20, 2000, pp. 56992–57022, the disclosure of which is incorporated herein by reference).

There exists a need for additional insulation materials and associated flame and/or fire protection materials. Preferably, these materials meet one or more of the applicable industry and/or government standards for a particular use.

SUMMARY OF THE INVENTION

The present invention provides a laminate sheet material comprising a first layer comprised of polymeric material and a second layer comprised of non-metallic fibers. The first and second layers at least collectively contribute to the laminate sheet material having at least one of a passing Flammability Value I, (i.e., if the laminate sheet material is subjected to the Flammability Test I defined herein, it will have a passing Flammability Value I), a passing Flammability Value II, (i.e., if the laminate sheet material is subjected to the Flammability Test II defined herein, it will have a passing Flammability Value), a passing Flame Propagation Value I (i.e., if the laminate sheet material is subjected to the Flame Propagation Test I defined herein, it will have a passing Flame Propagation Value I), a passing Flame Propagation Value II, (i.e., if the laminate sheet material is subjected to the Flame Propagation Test II defined herein, it will have a passing Flame Propagation Value II), or a passing Burnthrough Value (i.e., if the laminate sheet material is subjected to the Burnthrough Test as defined herein, it will have a passing Burnthrough Value). For some preferred embodiments of laminate sheet material according to the present invention, the first and second layers are sufficient to collectively provide the laminate sheet material having at least one of a passing Flammability Value I, a passing Flammability Value II, a passing Flame Propagation Value I, a passing Flame Propagation Value I, or a passing Burnthrough Value. The tests determining a passing Flammability Value I, a passing Flammability Value II, a passing Flame Propagation Value I, a passing Flame Propagation Value II, and a passing Burnthrough Value are described below under the heading "TEST PROCEDURES".

In another aspect, the present invention also provides a system for limiting exposure of flammable insulation material to an ignition source comprising:

laminate sheet material comprising:
a first layer comprised of polymeric material; and
a second layer comprised of non-metallic fibers, wherein the laminate sheet material is positioned between the flammable insulation material and the ignition source such that the first layer of the laminate sheet material is adjacent to the flammable insulation material. The first and second layers at least collectively contribute to the laminate sheet material having at least one of a passing Flammability Value I, a passing Flammability Value II, a passing Flame Propagation Value I, a passing Flame Propagation Value II, or a passing Burnthrough Value. For some preferred embodiments of laminate sheet material according to the present invention, the first and second layers are sufficient to collectively provide the laminate sheet material having at least one of a passing Flammability Value I, a passing Flammability Value II, a passing Flame Propagation Value I, a passing Flame Propagation Value II, or a passing Burnthrough Value. The tests determining a passing Flammability Value I, a passing Flammability Value II, a passing Flame Propagation Value I, a passing Flame Propagation Value II, and a passing Burnthrough Value are described below under the heading "TEST PROCEDURES".

Flammable insulation material refers to insulation material that is inherently flammable; insulation material that has been rendered flammable at least in part due to contamination with a material that renders it flammable (e.g., fuel, hydraulic fluids, and corrosion inhibitors), as well as insulation material that may or may not be inherently flammable but that has a flammable cover or layer thereon (e.g., a metallized polyester cover).

In another aspect, the present invention also provides an insulation system comprising:

laminate sheet material comprising:
a first layer comprised of polymeric material; and
a second layer comprised of non-metallic fibers; and
insulation material;

wherein the laminate sheet material and the insulation material are positioned such that the first layer of the laminate sheet material is adjacent to the insulation material. The first and second layers at least collectively contribute to the laminate sheet material having at least one of a passing Flammability Value I, a passing Flammability Value II, a passing Flame Propagation Value I, a passing Flame Propagation Value II, or a passing Burnthrough Value. For some preferred embodiments of laminate sheet material according to the present invention, the first and second layers are sufficient to collectively provide the laminate sheet material having at least one of a passing Flammability Value I, a passing Flammability Value II, a passing Flame Propagation Value I, a passing Flame Propagation Value II, or a passing Burnthrough Value. The tests determining a passing a passing Flammability Value I, a passing Flammability Value II, a passing Flame Propagation Value I, a passing Flame Propagation Value II, and a passing Burnthrough Value are described below under the heading "TEST PROCEDURES". The insulation material may be flammable or nonflammable.

In another aspect, the present invention also provides an insulation blanket comprised of:
laminate sheet material comprising:
a first layer comprised of polymeric material; and
a second layer comprised of non-metallic fibers; and
insulation material;
wherein the laminate sheet material and insulation material are positioned such that the first layer of the laminate sheet material is positioned adjacent to the insulation material. The first and second layers at least collectively contribute to the laminate sheet material having at least one of a passing Flammability Value I, a passing Flammability Value II, a passing Flame Propagation Value I, a passing Flame Propagation Value II, or a passing Burnthrough Value. For some preferred embodiments of laminate sheet material according to the present invention, the first and second layers are sufficient to collectively provide the laminate sheet material having at least one of a passing Flammability Value I, a passing Flammability Value II, a passing Flame Propagation Value I, a passing Flame Propagation Value II, or a passing Burnthrough Value. The tests determining a passing Flammability Value I, a passing Flammability Value II, a passing Flame Propagation Value I, a passing Flame Propagation Value II, and a passing Burnthrough Value are described below under the heading entitled "TEST PROCEDURES". The insulation material may be flammable or nonflammable.

The present invention is useful, for example, in a variety of situations where it is necessary or desirable to utilize a material or system to prevent or reduce the transfer of heat and/or flame. For example, embodiments according to the present invention can be utilized in the production of new aircraft and/or retrofitting existing aircraft to protect flammable material from potential ignition sources (e.g., short circuits from electrical wiring). For existing aircraft, laminate sheet material according to the present invention may be placed, for example, over the existing aircraft insulation material (typically a flammable insulation material) such that it is between the insulation material and a potential ignition source to reduce exposure of the insulation material from the ignition source.

The present invention also provides a vehicle comprising insulation material and a laminate sheet material according to the present invention, wherein the laminate sheet material and the insulation material are positioned such that the first layer of the laminate sheet material is positioned adjacent to the insulation material. The insulation material may be flammable or nonflammable.

The present invention also provides an aircraft comprising insulation material, electrical wiring, and laminate sheet material according to the present invention, wherein the laminate sheet material is positioned between the insulation material and electrical wiring, and wherein the first layer of the laminate sheet material is adjacent to the insulation material. The insulation material may be flammable or nonflammable.

The present invention also provides an aircraft comprising insulation material, a fuselage exterior skin, and laminate sheet material according to the present invention, wherein the laminate sheet material is positioned between the insulation material and the fuselage exterior skin, and wherein the first layer of the laminate sheet material is adjacent to the flammable insulation material. The insulation material may be flammable or nonflammable.

BRIEF DESCRIPTION OF THE DRAWINGS

FIG. 13b illustrates an enlarged detail view of a portion of FIG. 13a.

DETAILED DESCRIPTION OF THE INVENTION

Figure 2:
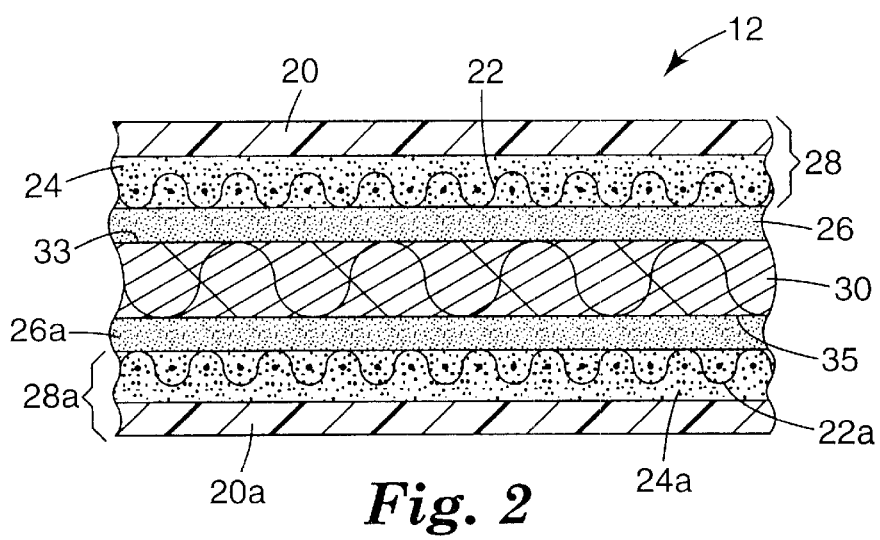
FIG. 2 is a partial cross-sectional view of the embodiment of the laminate sheet material according to the present invention shown in FIG. 1 utilizing flame retardant adhesive material to laminate scrim-reinforced polymeric layers to a second layer comprising non-metallic fibers.

Referring to FIG. 2, a cross-section of an embodiment of a laminate sheet material according to the present invention is shown. Laminate sheet material 12 comprises first layer 20 comprised of high temperature stable polymeric material having optional nylon scrim 22 bonded thereto via optional adhesive material 24. Optional flame-retardant adhesive material 26 bonds first layer 28 to first major surface 33 of second layer 30 comprised of non-metallic fibers. Second major surface 35 of second layer 30 is bonded to optional third layer 28a via optional flame-retardant adhesive material 26a. Optional third layer 28a is comprised of high temperature stable polymeric material 20a and nylon scrim 22a bonded thereto via a layer of optional adhesive material 24a.

First Layer

The laminate sheet material according to the present invention comprises a first layer comprised of polymeric material. Preferably, the first layer is comprised of high temperature stable polymeric material, wherein a high temperature stable polymeric material is typically stable (i.e. does not melt, burn or decompose) at a temperature of about 150° C., preferably about 200° C., more preferably about 300° C., and more preferably about 350° C.

Preferably, the first layer comprised of polymeric material is light in weight and demonstrates high temperature dimensional stability, little or no smoke, or combustible or toxic decomposition products upon exposure to flame, low or nonexistent moisture absorption, good abrasion resistance, and low water vapor permeability. Preferably, the first layer is a fluid barrier, wherein a fluid barrier refers to a material that prevents the passage of liquids such as water, jet fuel, corrosion inhibitors, and hydraulic fluids therethrough and preferably also prevents the passage of gases including combustible gases and water vapor therethrough.

Examples of suitable high temperature stable polymeric materials include, but are not limited to, polyamides, polyvinyl fluorides, silicone resins, polyimides, polytetrafluoroethylenes (PTFEs), polyesters, polyaryl sulfones, polyetheretherketones, polyester amides, polyester imides, polyethersulfones, polyphenylene sulfides and combinations thereof. Preferred high temperature stable polymeric materials include polyvinyl fluorides and polyimides due to their greater high temperature stability. Most preferred are the polyimides.

Typically, the first layer has a weight of less than about 100 grams per square meter, preferably less than about 50 grams per square meter. The average thickness of the first layer comprised of polymeric material can vary. Typically, the average thickness ranges from about 12 to about 125 micrometers, preferably about 12 to about 50 micrometers, and most preferably about 19 to about 25 micrometers. Preferably, the first layer comprised of polymeric material is thick enough such that the layer can be easily handled and processed without tearing, but not so thick as to add unnecessary weight to the laminate sheet material.

High temperature stable polymeric materials are commercially available. Representative examples thereof include polymide film, available, for example, under the trade designation "KAPTON"; polyvinyl fluoride film available, for example, under the trade designation "TEDLAR"; and polytetrafluoroethylene film available, for example, under the trade designation "TEFLON"; all available from E.I. duPont deNemours & Company, Wilmington, Del.

Preferably, the first layer is adhesively bonded to the second layer. Preferably, the first layer is coextensively bonded to the second layer. Preferably, a flame-retardant adhesive material adhesively bonds the first layer and the second layer. Examples of suitable flame-retardant adhesive materials are discussed below under the heading "Flame-Retardant Adhesive Material."

Scrim

The laminate sheet material according to the present invention may optionally further comprise one or more layers of scrim. For example, the first layer and the optional third layer may each optionally further comprise a scrim. The scrim, which is typically a woven reinforcement made from fibers, is included to provide tear resistant properties to the laminate sheet material. Suitable scrim materials include, but are not limited to, nylon, polyester, fiberglass, and the like. The average thickness of the scrim can vary. Typically, the average thickness of the scrim ranges from about 25 to about 100 micrometers, preferably about 25 to about 50 micrometers. The layer of scrim is preferably light weight, strong, and at least relatively nonflammable. Preferably, the scrim generates little or no smoke, or combustible or toxic decomposition products when exposed to flame.

The layer of scrim is typically positioned between a polymeric film layer of the first layer, or third layer, and the second layer of the laminate sheet material. The layer of the scrim may optionally be bonded to a polymeric material such as a film. A variety of adhesive materials can be used to bond the scrim to the polymeric material. Preferably, such an adhesive material has flame-retardant properties and a high decomposition temperature.

A number of high temperature stable polymeric films having a scrim attached thereto via an adhesive material are commercially available. Examples thereof include those available under the trade designations "INSULFAB 2000" and "INSULFAB KP121", from Facile Holdings, Inc., Patterson, N.J., both of which comprise a polyimide film, a nylon scrim, and a flame-retardant adhesive material.

Another example is that available under the trade designation "INSULFAB 330", commercially available from Facile Holdings, Inc., which comprises a metallized polyvinyl fluoride film, a nylon scrim, and a flame-retardant adhesive material.

Second Layer

The laminate sheet material according to the present invention also comprises a second layer comprised of non-metallic fibers. Preferably, the fibers are stable (i.e. do not melt, burn, or decompose) at a temperature of about 250° C., more preferably about 350° C., even more preferably about 450° C., and most preferably about 550° C. The second layer typically comprises first and second major surfaces. The second layer is preferably in the form of a fabric, such as woven fabrics, knitted fabrics, and nonwoven fabrics including paper. Preferably, the second layer is electrically non-conductive, light weight, thermal insulating, and has a gas permeability less than about 460L/min./dm$^2$. Preferably, the second layer does not readily absorb moisture and generates little or no combustible or toxic decomposition products upon exposure to a flame.

Preferably, the second layer comprises a nonwoven fabric in order to provide a thin, lighter weight laminate sheet material which is particularly desirable in aircraft applications. Typically, the second layer has a weight of about 30 to about 150 grams per square meter.

The average thickness of the second layer can vary. Typically, the average thickness of the second layer ranges from about 75 to about 750 micrometers, preferably about 125 to about 500 micrometers, and most preferably about 200 to about 450 micrometers. Preferably, the second layer is thick enough to provide the desired Flammability, Burnthrough, and/or Flame Propagation properties but not so thick as to provide unnecessary weight to the laminate sheet material.

Suitable non-metallic fibers include, but are not limited to, glass fibers, aramid fibers, crystalline ceramic oxide (including quartz) fibers, silicon nitride fibers, silicon carbide fibers, oxidized polyacrylonitrile fibers, carbon fibers, and combinations thereof. The fibers are typically provided as individual fibers or as bundled fibers, varying in length from a few centimeters to several meters. Preferably, the non-metallic fibers are glass fibers, crystalline ceramic oxide fibers, or combinations thereof. It is understood that crystalline ceramic oxide fibers may contain minor amounts of glassy phases at the grain boundaries. More preferably, the second substrate comprises primarily ceramic oxide fibers.

Ceramic oxide materials are typically metal oxides that have been consolidated by the action of heat. Ceramic oxide fibers generally refer to a class of fibers typically containing one or more oxides of aluminum, silicon, and boron. Many other additives may also be present (e.g., oxides of sodium, calcium, magnesium, and phosphorus) within the fibers, although the fibers include primarily metal oxides. Typically, the ceramic oxide fibers are crystalline ceramics and/or a mixture of crystalline ceramic and glass (i.e., a fiber that contains both crystalline ceramic and glass phases).

Ceramic oxide fibers are commercially available, for example, in relatively short fibers typically referred to as "refractory ceramic fibers" (RCF). They are generally weak, friable, and not typically suitable for use in textiles (i.e. woven, knitted, and nonwoven fabrics). They can also include particulate material (known as, shot). Fibers including shot are typically formed from a melt using a melt-blown method or a melt-spinning fiber forming method and subsequently cooled. In standard fiber forming methods, molten material of the desired composition is extruded resulting in fibers of relatively nonuniform length (e.g., varying from about 1 micrometer to about 10 centimeters) of a relatively nonuniform diameter (e.g., about 1 micrometer to about 50 micrometers). Typically, refractory ceramic fibers are provided by the manufacturer in a "staple" form (i.e., as a mass of loose fibers). Examples of refractory ceramic fibers include aluminosilicate fibers available, for example, under the trade designations "7000M" from Unifrax of Niagara Falls, N.Y., and "SNSC" Type 1260 D1 RCF from Nippon Steel Chemical Co. of Tokyo, Japan.

Ceramic oxide fibers are also commercially available as relatively long (e.g., continuous) fibers typically grouped together in the form of yarns (twisted fibers) or tows (nontwisted fibers). Such ceramic oxide yarns or tows typically include about 400 to about 7800 individual ceramic oxide fibers having diameters ranging from about 7 to 15 micrometers. The yarns or tows generally have a diameter of about 0.2 millimeter to about 1.5 millimeters. Yarn diameters in this range can be woven into second layers and typically have superior textile qualities, particularly as compared to the shorter refractory ceramic fibers. Ceramic oxide yarn can be ply-twisted, which means that two or more yarns are twisted together. This typically is done to increase the strength of the yarn. Examples of such continuous fibers include aluminosilicate fibers, aluminoborosilicate fibers, and alumina fibers (all of which are available, for example, under the trade designation "NEXTEL" from the 3M Company of St. Paul, Minn.).

Fiber tows or yarns can be chopped using a glass roving cutter, such as, for example, that commercially available under the trade designation "MODEL 90 GLASS ROVING CUTTER" from Finn & Fram, Inc. of Pacoima, Calif., or with scissors, to the desired length. The chopped fibers can then be separated or individualized by passing them through a waste pulling machine, which is commercially available, for example, under the trade designation "CADETTE 500" from LaRoche of Cours, France.

Preferred ceramic oxide fibers are aluminosilicate, aluminoborosilicate, and alumina fibers, and may be in the form of yarns or in the form of staple fibers. Suitable aluminosilicate fibers are described, for example, in U.S. Pat. No. 4,047,965 (Karst et al.), the disclosure of which is incorporated herein by reference. Preferably, the aluminosilicate fibers include, on a theoretical oxide basis, about 67% to about 85% by weight $Al_2O_3$ and about 33% to about 15% by weight $SiO_2$, based on the total weight of the aluminosilicate fibers. Some preferred aluminosilicate fibers include, on a theoretical oxide basis, about 67% to about 77% by weight $Al_2O_3$ and about 33% to about 23% by weight $SiO_2$, based on the total weight of the aluminosilicate fibers. One preferred aluminosilicate fiber includes, on a theoretical oxide basis, about 85% by weight $Al_2O_3$ and about 15% by weight $SiO_2$, based on the total weight of the aluminosilicate fibers. Preferred aluminosilicate fibers are commercially available, for example, under the trade designations "NEXTEL 550" and "NEXTEL 720" from the 3M Company.

Suitable aluminoborosilicate fibers are described, for example, in U.S. Pat. No. 3,795,524 (Sowman), the disclosure of which is incorporated herein by reference. Preferably, the aluminoborosilicate fibers include, on a theoretical oxide basis, about 55% to about 75% by weight $Al_2O_3$, less than about 45% (preferably, less than about 44%) by weight $SiO_2$, and less than about 25% (preferably, about 5%) by weight $B_2O_3$, based on the total weight of the aluminoborosilicate fibers. Preferred aluminoborosilicate fibers are commercially available, for example, under the trade designations "NEXTEL 312" and "NEXTEL 440" from the 3M Company.

Methods for making suitable alumina fibers are known in the art and include the method disclosed, for example, in U.S. Pat. No. 4,954,462 (Wood et al.), the disclosure of which is incorporated herein by reference. Preferably, the alumina fibers include, on a theoretical oxide basis, greater than about 99% by weight $Al_2O_3$ and about 0.2–0.3% by weight $SiO_2$, based on the total weight of the alumina fibers. Preferred alpha alumina fibers are available, for example, under the trade designation "NEXTEL 610" from the 3M Company. Another alpha alumina fibers, which comprises about 90 percent by weight $Al_2O_3$, amount 9 percent by weight $ZrO_2$, and about 1 percent by weight $Y_2O_3$, based on the total weight of the fibers, commercially available from the 3M Company is that marketed under the trade designation "NEXTEL 650".

Examples of other suitable inorganic fibers include: quartz fibers, which also are a subset of ceramic oxide fibers and are commercially available, for example, under the trade designation "ASTROQUARTZ" from J. P. Stevens, Inc., of Slater, N.C.; glass fibers, such as magnesium aluminosilicate glass fibers, which are commercially available, for example, under the trade designation "S2-GLASS" from Owens-Corning Fiberglas Corp. of Granville, Ohio.; silicon carbide fibers, which are commercially available, for example, under the trade designations "NICALON" from Nippon Carbon of Tokyo, Japan, or Dow Corning of Midland, Mich., and "TYRANNO" from Textron Specialty Materials of Lowell, Mass.; carbon (e.g., graphite) fibers, which are commercially available, for example, under the trade designation "IM7" from Hercules Advanced Material Systems of Magna, Utah.; silicon nitride fibers, which are available, for example, from Toren Energy International Corp. of New York, N.Y.

Preferably, the second layer is comprised of a nonwoven fabric. Suitable nonwoven fabrics can be made by a variety of methods, as is known in the art. Preferably, they are made by a "wet-lay" method, or by an "air-lay" method. In a wet-lay method, fibers are mixed with a liquid medium (preferably water) and other additives (such as surfactants, dispersants, binders, and anti-flocculants) under high shear conditions. The resulting slurry of fibers is deposited onto a screen, where the liquid medium is drained away to produce a fabric. In an air-lay method, individualized fibers are fed into a web forming machine, which transports the fibers by means of an air stream onto a screen, to produce a nonwoven fabric. Such processes are well known in the art of nonwoven fabric manufacture.

In a typical wet-lay method, binder material such as thermoplastic fibers (e.g., PVA fibers) are blended at high shear in water. Non-metallic fibers (chopped fibers and/or staple fibers) are added to the blender. High shear mixing typically causes at least some fibers to break, resulting in an overall reduction of fiber length. Mixing is carried out for a time sufficient to suspend the fibers in the water. Flocculating agent, such as an aqueous polyacrylamide solution, which is commercially available, for example, under the trade designation "NALCO 7530" from Nalco Chemical Co. of Napierville, Ill., can optionally be added during the mixing step to cause coagulation of the fibers if so desired. This aqueous fiber "slush" is then typically cast onto a screen (e.g., a papermaker) and drained to remove the water. The resultant nonwoven fabric is pressed with blotter paper to remove as much water as possible, and then dried in an oven to further remove the water (typically, at about 100° C.). The nonwoven fabric is then ready for further processing.

In a typical air-lay method, non-metallic fibers (chopped fibers and/or staple fibers) are mixed with a binder material, particularly thermoplastic fibers, in a fiber feeder, such as that commercially available under the trade designation "CMC EVEN FEED" from Greenville Machine Corp. of Greenville, S.C., to form a feed mat. The feed mat is fed into a rotating brush roll which breaks the feed mat up into individual fibers. The individual fibers can then be transported through a blower to a conventional web forming machine, such as that commercially available under the trade designation "DAN WEB"from Scan Web Co. of Denmark, wherein the fibers are drawn onto a wire screen. While still on a screen, the fabric can be moved through an oven and heated to temperatures ranging from about 120° C. to about 150° C for about 1 minute to melt the thermoplastic fibers and bond the fibers of the fabric together. Optionally, or alternatively, the nonwoven fabric can be compressed and heated by passing through laminating rollers, for example, to melt the thermoplastic fibers. The nonwoven fabric is then ready for further processing.

Preferably, at least about 10% by weight of the non-metallic fiber content of the second layer, based on the total non-metallic fiber weight of the second layer, is comprised of fibers having a length(s) of at least about 5 millimeters (preferably, at least about 1 centimeter). More preferably, at least about 25% by weight of the non-metallic fiber content of the second layer is comprised of fibers having a length(s) of at least about 5 millimeters (preferably, at least about 1 centimeter). If desired, 100% of the non-metallic fiber content of the second layer can be fibers having a length(s) of at least about 5 millimeters (preferably, at least about 1 centimeter). It is understood that the fibers can be all one length, although they are typically of a variety of lengths. There is no known limit to the length of the fibers, although typically fibers longer than about 10–15 centimeters are not practical in a second layer such as a nonwoven construction. Furthermore, as long as there are a sufficient number of fibers of at least about 5 millimeters in length, the second layer can also include shorter fibers of about 1 millimeter (and even particles of about 10-micrometer particle size).

Preferably, ceramic oxide fibers utilized in the second layer have diameters in the range from about 3 to about 25 micrometers; more preferably, from about 7 to about 15 micrometers. Fibers having diameters greater than about 25 micrometers are useful, but tend to have lower flexibility than those made with smaller diameter fibers. Fibers having diameters less than about 3 micrometers may also be useful but are not preferred.

Although the fibers used to prepare the second layer can be sized or unsized, the fibers are typically available in their as-received condition with a size coating present. Typically, continuous fibers are treated with organic sizing materials during their manufacture to provide lubricity and to protect the fiber strands during handling. It is believed that the sizing tends to reduce breakage of fibers and reduce static electricity during handling and processing steps. When making a non-woven fabric by wet-lay methods, the sizing tends to dissolve away. Sizing also can be removed after fabrication by heating the fabric to high temperatures (i.e., 3000 C).

It is within the scope of the present invention for the second layer to employ one of several types of fiber, including utilizing fibers of different compositions. Typically, the second layer comprises at least about 75 percent by volume (preferably at least about 90, about 95, or even about 100 percent by volume) ceramic oxide fiber, based on the total fiber volume of the second layer.

Third Layer

The laminate sheet material according to the present invention optionally further comprises a third layer comprised of polymeric material. Typically, the third layer has first and second opposite major surfaces. Typically, the second layer is positioned between the first layer and the third layer. The third layer may be selected to be the same as or different than the first layer. The previous discussion regarding the first layer is also applicable to the third layer.

Preferably, the third layer is adhesively bonded to the second layer. Preferably, the third layer is coextensively bonded to the second layer. Preferably, a flame-retardant adhesive material adhesively bonds the second and the third layers together.

Metal Oxide Coating

A material comprising a metal oxide may optionally be secured to at least a portion of the second layer, which is typically a fabric (more typically a nonwoven fabric). The metal oxide coating typically serves to strengthen the second layer. Preferably, the second layer has a first and second major surface and the metal oxide is in the form of a coating present on only a portion of at least one of the major surfaces of the second layer.

The metal oxide coating in one embodiment of the laminate sheet material is positioned on only a portion of at least one surface of the second layer, producing an arrangement of discrete coated regions (also referred to herein as "printed regions"). This arrangement of the regions of metal oxide coating can be regular or random. Typically, the metal oxide coating is deposited on the second layer in a predetermined pattern using, for example, screen printing techniques and a metal oxide source (preferably, a colloidal metal oxide source). A paper having metal oxide coated regions thereon which is useful according to the present invention is available from the 3M Company under the trade designation "NEXTEL Flame Stopping Dot Paper".

Typically, the regions of metal oxide coating are spaced apart such that the distance between any two regions (e.g., any two islands) is approximately equal to the length of at least some of the fibers in the second layer, which is preferably a nonwoven fabric. Preferably, for any one surface having a metal oxide coating thereon, the percentage of surface area of that particular surface of the second layer that is coated with a metal oxide is in a range of about 5% to about 25%, more preferably about 10% to about 20%. Typically, a second layer sample of about 20 centimeters square has a coating weight of a colloidal metal oxide of at least about 0.5 gram.

Figure 14:
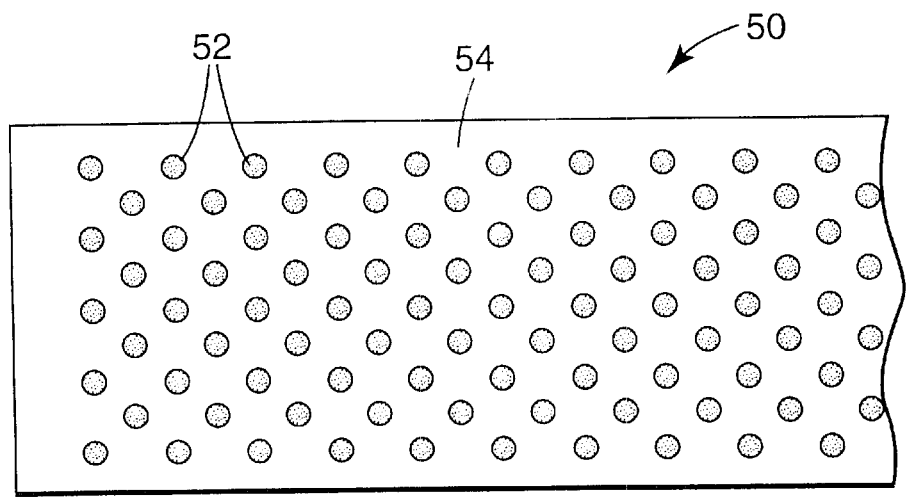
FIG. 14 is a schematic illustration of a top view of a portion of an embodiment of a second layer comprising non-metallic fibers having a metal oxide coating arrayed in a discrete pattern on the surface thereof, which is useful in laminate sheet material according to the present invention.

FIG. 14 illustrates a top view of a portion of second layer 50 of an exemplary laminate sheet material according to the present invention having a repeating pattern of discrete regions of metal oxide coating 52 surrounded by regions of non-woven fabric 54 with substantially no coating, thereby producing islands in the form of dots, on at least one major surface of the second layer. This pattern results, for example, from a discontinuous coating of metal oxide. The islands could take other forms, such as crosses or bars.

Alternate second layers useful for the present invention may have patterns of generally continuous lines of printing in which there are regions of a metal oxide coating next to regions of substantially no coating, on at least one major surface of the second layer. Although these patterns result, for example, from continuous coatings of metal oxide, they are still in discrete regions and coat only a portion of the surface of the second layer.

In one embodiment of a laminate sheet material according to the present invention, the metal oxide is arranged in a plurality of islands on the second layer, wherein the plurality of islands have a total surface area of about 5% to about 25%, based on the total surface area of the major surfaces of the second layer having the metal oxide coating thereon.

In another embodiment of a laminate sheet material according to the present invention, the second layer comprises a nonwoven fabric and the nonwoven fabric comprises at least about 10% by weight of the non-metallic fibers that are at least about 5 millimeters in length, wherein the metal oxide covers about 5% to about 25% of the total surface area of the major surfaces having the metal oxide coating thereon.

The coating pattern illustrated in FIG. 14 is to be contrasted with a coating on the entire surface of a second layer. Coating the entire surface of a second layer typically makes the resultant second layer undesirably inflexible. This typically leads to cracking and breaking of the second layer when it is handled, particularly when it must be installed into, for example, a nonplanar space.

Preferably, the number, size, and position of the regions of metal oxide coating are sufficient for the second layer to retain its integrity when wrapped once around a 6 millimeter diameter rod and unwrapped. That is, after being subjected to "Flexibility Test for Second Layer" set forth in "TEST PROCEDURES", although cracks may appear and some individual fibers may break, the second layer does not fall apart, split apart, or disintegrate into smaller portions or individual fibers.

In one embodiment, the second layer is comprised of a nonwoven fabric that includes an amount of non-metallic fibers of at least about 5 millimeters in length, and an amount and arrangement of metal oxide coating, both of which (the amount of nonmetallic fibers of at least about 5 millimeters in length, and the amount/arrangement of metal oxide coating) are sufficient to retain the integrity of the second when it is wrapped once around a 6 millimeter diameter rod and then unwrapped.

Typically, the second layer has a sufficient amount of fibers that are long enough to bridge the space between any coated regions (e.g., printed metal oxide portions of the second layer).

Examples of useful metal oxide coated nonwoven fabrics are disclosed in U.S. Pat. No. 5,955,177 (Sanocki et al.) the disclosure of which is incorporated herein by reference. A metal oxide source which can be deposited on the second layer includes, for example, a dispersion (i.e., a suspension) of a colloidal metal oxide, which may also include soluble metal oxides, and/or a solution of a metal oxide precursor. Alternatively, a metal oxide source does not require use of a liquid medium. That is, the metal oxide can be deposited on the second layer in a pattern through a mask, for example, using sputtering or powder coating. Preferably, the metal oxide is deposited from a metal oxide source having a liquid medium (e.g., an aqueous dispersion or solution), and more preferably from a dispersion of colloidal metal oxide.

As used herein when describing a metal oxide coating on the second layer, the term "metal" includes metalloids, such as silicon. Precursors of metal oxides include solutions of metal salts, which may be converted by heat in an oxygen atmosphere to a metal oxide, and often a colloidal metal oxide. For example, a nitrate salt of aluminum ($Al(NO_3)_3$) can be a precursor to colloidal alumina. Colloidal metal oxides are particles of metal oxide having one or more of their dimensions between 1 nanometer and 1 micrometer. Such colloidal metal oxides include, but are not limited to, alumina, zirconia, titania, silica, ceria colloids, and mixtures of these colloids. Colloidal silica is particularly preferred. A colloidal silica suitable for practice of this invention is commercially available, for example, under the trade designation "NALCO 2327" from Nalco Chemical Co. of Napierville, Ill.

Preferably, the metal oxide source is deposited by a screen printing process. A hand screen printer, or a rotoscreen printer, such as that commercially available, for example, under the trade designation "TYPE RMR-LAB 83" from Johannes Zimmers of Klagenfurt, Austria, is suitable for use according to the present invention. The pattern and printing speed can be altered depending on the desired characteristics of the final laminate sheet material.

Typically, commercially available colloidal metal oxide dispersions and/or solutions of a metal oxide precursor have viscosities that are lower than desired for a screen printing process. To increase the viscosity of such dispersions or solutions, various thickening agents, such as methylcellulose or polyvinyl alcohol, can be added. A preferred thickening agent is carboxymethyl cellulose, which is commercially available, for example, under the trade designation "CARBOPOL 934" from B. F. Goodrich of Cleveland, Ohio.

Typically, the source of metal oxide (preferably, a colloidal metal oxide dispersion) is printed onto only a portion of at least one major surface of the second layer, although both major surfaces can each have only a portion coated with metal oxide. In particularly preferred embodiments, the source of metal oxide is printed onto at least one major surface of the second layer as a plurality of islands (i.e., discontinuous regions of coating surrounded by regions without any coating).

Typically, the metal oxide coating will at least partially penetrate into the thickness of the second layer (while still remaining in discrete regions), although if the amount of coating is small enough it may remain substantially at the surface of the second layer. At least some penetration by the metal oxide into the second layer is desirable because the penetration is believed to produce enhanced tensile strength for the second layer. For certain applications, the metal oxide coating may penetrate through the entire thickness of the second layer to the other major surface (while still remaining in discrete regions).

After depositing the source of metal oxide on the second layer, it is typically dried in air for a time sufficient to remove volatile materials, if they are present. The removal of organic materials (e.g., sizing or organic binder) is not necessary. Typically, however, the second layer is heat treated at a temperature and for a time sufficient to remove substantially all the organic materials present in the second layer (e.g., the organic binder). This heat treatment step is typically carried out at a temperature of at least about 500° C for at least about 10 minutes. This heating step can also serve to at least partially convert metal oxide precursors, if used, to the corresponding metal oxide. Preferably, however, the second layer is heat treated at a temperature and for a time sufficient to convert all of the metal oxide precursor to a metal oxide. At elevated temperatures (typically, at least 800° C.), colloidal metal oxide can also be converted to the corresponding ceramic metal oxide, although this is not a requirement. After heating at at least one elevated temperature, the second layer is coated with a metal oxide and substantially no organic material.

Inorganic Oxide Platelets

Inorganic oxide platelets may optionally be secured to at least a portion of the second layer. The inorganic oxide platelets are preferably at least one of clay platelets, vermiculite platelets, mica platelets, talc platelets, and combinations thereof. Preferably, the inorganic oxide platelets are stable (i.e., do not burn, melt or decompose) at about 600° C; more preferably, at about 800° C., and most preferably, at about 1000° C. In one embodiment of the laminate sheet material the second layer has both metal oxide and inorganic oxide platelets secured thereto.

The inorganic oxide platelets preferably decrease the gas permeability of the second layer. It is desirable to reduce gas permeability to decrease potential flame penetration through the second layer.

The inorganic oxide platelets may, for example, be secured to one or both sides of the second layer and/or through some or the entire thickness of the second layer. Typically, the platelets are secured to one or both sides of the second layer in addition to at least a portion of the inner thickness of the second layer. If too many platelets are secured to the second layer, the second layer may become brittle and too heavy. If not enough platelets are secured to the second layer, the desired reduction in gas permeability may not be achieved. If platelets are secured to the second layer, typically about 25 to about 70 percent by weight, more preferably about 30 to about 50 percent by weight are included based upon the total weight of the second layer (excluding the weight of the platelets).

Preferably, sufficient platelets are secured to the second layer to provide a gas permeability of less than about 760 L/min./dm$^2$, more preferably less than about 460 L/min./dm$^2$. The platelets may be bonded to the second layer by a number of different methods such as chemically (e.g., via hydrogen bonding) or via a binder such as a polyvinyl alcohol, acrylate latex, or the like. Alternatively, or in addition, the fibers themselves can be used to secure the platelets to the second layer. This can occur, for example, by mixing together fibers and platelets and applying sufficient heat and pressure to form a second layer having the platelets secured thereto.

Vermiculite

As mentioned above vermiculite platelets may optionally be secured to at least a portion of the second layer. Vermiculite is a hydrated magnesium aluminosilicate, micaceous mineral found in nature as a multilayer crystal. Vermiculite typically comprises by (dry) weight, on a theoretical oxide basis, about 38–46% $SiO_2$, about 16–24% MgO, about 11–16% $Al_2O_3$, about 8–13% $Fe_2O_3$, and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. These platelets optionally can be ground up to produce small particulate, typically ranging in size (i.e., length and width) from about 0.3 micrometer to about 100 micrometers, with a mean size of about 20 micrometers. This small particulate is still considered to be in "platelet" form as that term is used herein. The thickness of a platelet typically ranges from about 10 Angstroms to about 4200 Angstroms. The vermiculite can be applied to the second layer, for example, by dispersing vermiculite platelets in a liquid medium (typically water), and applying (e.g., coating) the dispersion onto the second layer. Aqueous vermiculite particle dispersions are available, for example, from W. R. Grace of Cambridge, Mass., under the trade designation "MICROLITE 963". The desired concentration of the dispersion can be adjusted by removing or adding liquid media thereto.

The vermiculite can be applied to the second layer using conventional techniques such as dip coating, spray coating, and brush coating. Preferably, the vermiculite is "worked into" or uniformly distributed into the second layer. For example, the vermiculite can typically be forced into the second layer by pressure (e.g., by using a conventional hand held roller; by hand flexing the coated fabric back and forth; and/or by passing the vermiculite coated second layer between two opposed rolls positioned, or capable of being positioned, such that the gap between is less than the thickness of the coated second layer). Optionally, the vermiculite dispersion can be heated to a temperature below the boiling point of the liquid media before it is applied to the second layer. Further, the coated second layer can be at an elevated temperature (e.g., a temperature at or above the boiling point of the liquid media in the dispersion) before, and/or while the pressure is being applied.

A preferred method for coating the second layer is to dip the second layer into a vermiculite dispersion for at least several seconds, remove the second layer from the dispersion, allow excess dispersion material to drain off, and then dry the coated second layer in an oven (e.g., at 95° C. for 2 hours).

In another method, vermiculite can be applied to the second layer using conventional techniques, and prior to drying, the vermiculate coated second layer can be run between two opposed rolls positioned, or capable of being positioned, such that the gap therebetween is less than the thickness of the coated second layer. Preferably, the coated second layer is at an elevated temperature (e.g., a temperature at or above the boiling point of the liquid media in the dispersion) before, and/or while it is passed between the rolls.

Coating with vermiculite dispersion at a low concentration tends to distribute the vermiculite platelets at the intersections of the individual fibers in the second layer such as a nonwoven paper. In areas where three or more fibers intersect, the vermiculite dispersion can bridge the region between the fibers and on removal of the liquid media, dry to a thin inorganic film that is transparent until heated. These bridged areas preferably disrupt the air flow and reduce the permeability through the second layer, but preferably do not make the second layer so brittle that it fails the Second Layer Flexibility Test.

Figure 13A:
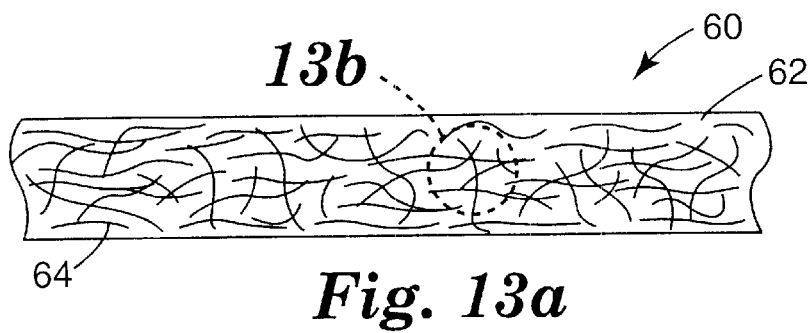
FIG. 13a is a schematic illustration of a cross-section of an embodiment of a second layer comprising non-metallic fibers infiltrated with a vermiculite dispersion, which is useful in laminate sheet material according to the present invention.
Figure 13B:
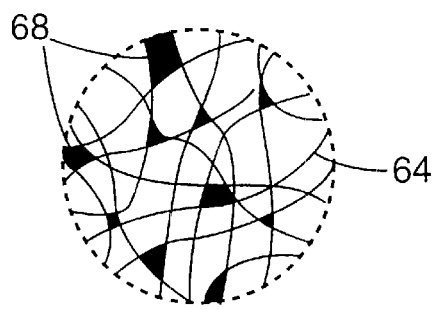

FIG. 13 is a cross-sectional view of an exemplary portion of second layer 60 comprised of non-woven fabric 62 comprising fibers 64 that has been impregnated with a vermiculite dispersion and then dried. FIG. 13*b*, which is an enlarged detailed view of a portion of second layer 60 showing bridging areas 68 of a thin vermiculite film at multiple (three or more) fiber 64 intersections.

Clay

In another embodiment according to the present invention, clay platelets are secured to at least a portion of the second layer. The clay can be secured to the fabric in a similar manner as the vermiculite platelets discussed above. Examples of useful clays include, but are not limited to, kaolins, ball, hydrated aluminum silicate, kaolinite, atapulgite, illite, halloysite, beidelite, nontronite, hectorite, hectite, bentonite, saponite, montmorillonite, and combinations thereof.

Mica

In another embodiment according to the present invention, mica platelets are secured to at least a portion of the second layer. The mica can be secured to the second layer in a similar manner as the vermiculite platelets discussed above. Examples of useful micas include, but are not limited to, phlogoplic micas, muscovite micas, and combinations thereof. Mica coated papers are commercially available.

Talc

In another embodiment according to the present invention, talc platelets are secured to at least a portion of the second layer. The talc platelets can be secured to the second layer in a similar manner as the vermiculite platelets discussed above.

Third Layer

The laminate sheet material according to the present invention optionally further comprises a third layer comprised of polymeric material. Typically, the third layer has first and second opposite major surfaces. Typically, the second layer is positioned between the first layer and the third layer. The third layer may be selected to be the same as or different than the first layer. The previous discussion regarding the first layer is also applicable to the third layer.

Preferably, the third layer is adhesively bonded to the second layer. Preferably, the third layer is coextensively bonded to the second layer. Preferably, a flame-retardant adhesive material adhesively bonds the second and the third layers together.

Flame-Retardant Adhesive Material

The laminate sheet material according to the present invention optionally further comprises flame-retardant adhesive material. The term flame-retardant adhesive material as used herein typically refers to an adhesive material which contains a flame-retardant additive(s) in a sufficient amount such that the adhesive material will not support combustion. Representative examples of such additives include, but are not limited to, antimony compounds, hydrated alumina compounds, ammines, borates, carbonates, bicarbonates, inorganic halides, phosphates, sulfates, organic halogens and organic phosphates. A flame-retardant adhesive may be used, for example, to bond the first layer to one surface of the second layer. A flame-retardant adhesive material may also be used, for example, to bond an opposite surface of the second layer to a third layer comprised of polymeric material. A continuous or discontinuous layer of flame-retardant adhesive material may be used to bond layers within the laminate sheet material, such as the first layer to the second layer. Preferably, a continuous layer of adhesive material is used for uniformity reasons.

As discussed above, a flame-retardant adhesive material may optionally be used to adhere a scrim layer to a polymeric film layer of a first or third layer, for example, of the laminate sheet material. It is desirable that any adhesive material used in the laminate sheet material be a flame-retardant adhesive material. However, if the laminate sheet material is constructed using minimal quantities of adhesive material that do not contain flame retardant additives it still may possess the desired properties with respect to Flammability, Flame Propagation and/or Burnthrough.

Laminate Sheet Material

Preferably, the laminate sheet material according to the present invention has a weight of less than about 500 grams per square meter; more preferably, less than about 400 grams per square meter; and most preferably, less than about 350 grams per square meter. Preferably, the average thickness of the laminate sheet material ranges from about 75 to about 1200 micrometers; more preferably, from about 125 to about 625 micrometers; and most preferably, from about 200 to about 450 micrometers.

Preferably, the laminate sheet material is essentially non-absorbent. It is not desirable for the laminate sheet material to absorb water or other fluids that it may come into contact with.

Preferably the laminate sheet material retains its integrity when the laminate sheet material is wrapped once around a 6 millimeter diameter rod and then unwrapped (i.e., it preferably passes the "Flexibility Test for laminate Sheet Materials" under the "TEST PROCEDURES" heading). The laminate sheet material according to the present invention is preferably flexible but not to the point where it is floppy. Having some stiffness is advantageous, for example, for inserting the laminate sheet material between the electrical wires and the insulation in the aircraft.

The laminate sheet material according to the present invention if tested according to the "TEST PROCEDURES" section later herein will have at least one of a passing Flammability Value I, Flammability Value II, Flame Propagation Value I, Flame Propagation Value II, or Burnthrough Value.

Embodiments of the present invention can be utilized in the production of new aircraft and/or retrofitting existing aircraft to protect flammable material from potential ignition sources (e.g., short circuits from electrical wiring). For existing aircraft, laminate sheet material according to the present invention may be placed, for example, over the existing aircraft insulation material (typically a flammable insulation material) such that it is between the insulation material and a potential ignition source to reduce exposure of the insulation material from the ignition source.

Figure 1:
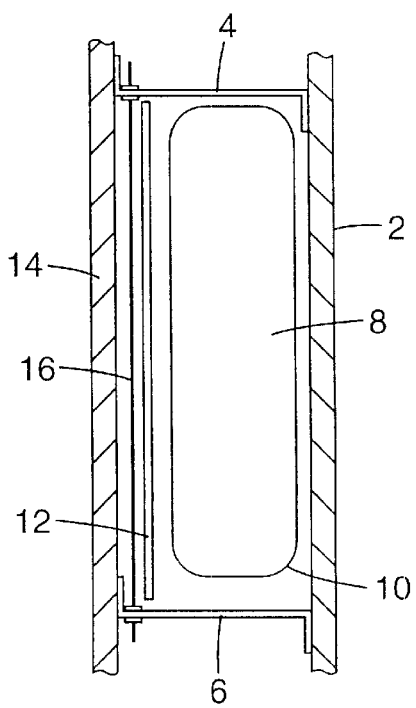
FIG. 1 is a cross-sectional view of a portion of an aircraft showing an aircraft fuselage with an embodiment of laminate sheet material according to the present invention positioned between an insulation bag and electrical wiring.

For example, FIG. 1 illustrates a cross-sectional view of a portion of an aircraft. Positioned against outer fuselage skin 2 and between frames 4 and 6 is insulation bag 8. Insulation bag 8 comprises fiberglass insulation (not shown) encased within metallized polyester cover 10. The purpose of metallized polyester cover 10 is to protect the fiberglass insulation from condensation and other fluids it may come into contact with. Laminate sheet material 12 according to the present invention is positioned on the side of insulation bag 8 opposite outer fuselage skin 2, adjacent to interior trim panel 14 and interposed between insulation bag 8 and electrical wiring 16. Laminate sheet material 12 is advantageously located as shown such that in the event of a fire from an electrical short circuit, laminate sheet material 12 preferably prevents spread of fire to flammable metallized polyester cover 10 of insulation bag 8 from which it could potentially spread throughout the rest of the aircraft.

FIG. 2 is a partial cross-sectional view of laminate sheet material 12 of FIG. 1. Laminate sheet material 12 comprises first layer 20 comprised of high temperature stable polymeric material and optional nylon scrim 22 bonded thereto via optional adhesive material (preferably flame-retardant adhesive material) 24. Optional flame-retardant adhesive material 26 bonds first layer 28 to first major surface 33 of second layer 30 comprised of non-metallic fibers. The second layer 30 in this embodiment comprises previously described "NEXTEL Flame Stopping Dot Paper". Alternatively, for example, the second layer may comprise vermiculite coated "NEXTEL Flame Stopping Dot Paper", mica coated paper, or vermiculite coated refractory ceramic paper. Second major surface 35 of second layer 30 is bonded to optional third layer 28a via optional flame-retardant adhesive material 26a. Third layer 28a is comprised of high temperature stable polymeric material 20a and has optional nylon scrim 22a bonded thereto via a layer of optional adhesive material (preferably flame-retardant adhesive material) 24a.

Figure 3:
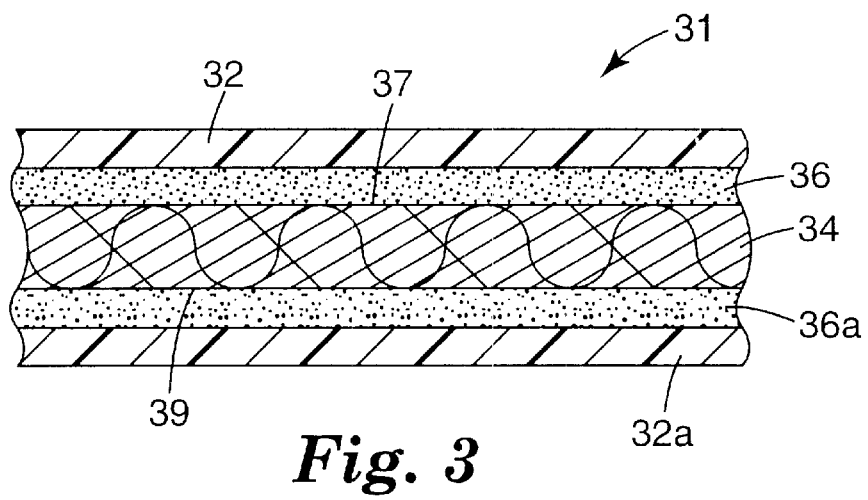
FIG. 3 is a partial cross-sectional view of another embodiment of laminate sheet material according to the present invention wherein non-reinforced polymeric layers are laminated to the second layer comprising non-metallic fibers via flame retardant adhesive material.

FIG. 3 is a partial cross-sectional view of another embodiment of a laminate sheet material 31 according to the present invention. First layer 32 is comprised of high temperature stable polymeric film bonded to first major surface 37 of second layer 34 via optional flame-retardant adhesive material 36. Opposite second major surface 39 of second layer 34 is bonded to optional third layer 32a comprised of high temperature stable polymeric film via optional flame-retardant adhesive material 36a.

Figure 4:
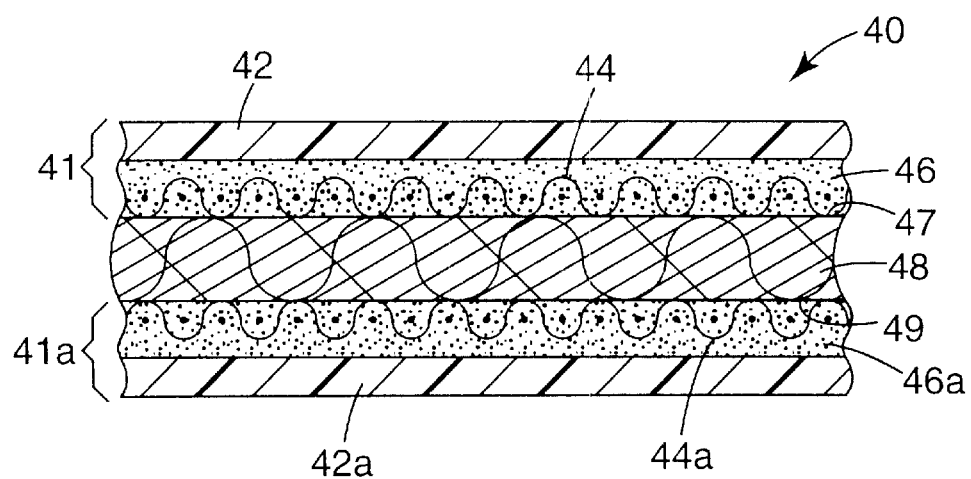
FIG. 4 is a partial cross-sectional view of another embodiment of laminate sheet material according to the present invention wherein scrim-reinforced polymeric layers are laminated directly to a second layer comprising non-metallic fibers without an additional adhesive component.

FIG. 4 is a partial cross-section of another embodiment of a laminate sheet material 40 according to the present invention. Laminate sheet material 40 is comprised of first layer 41 comprised of a high temperature stable polymeric film 42 having optional nylon scrim 44 bonded thereto via optional adhesive material (preferably, flame retardant adhesive material) 46. A sufficient amount of adhesive material 46 extends through scrim 44 to allow first layer 41 to be laminated directly to first major surface 47 of second layer 48 by application of heat and pressure, using a heated calandar, for example, to form a laminate of the first layer 41 and second layer 48. Laminate sheet material 40 further comprises optional third layer 41a laminated to second major surface 49 of second layer 48. Third layer 41a is comprised of high temperature stable polymeric film 42a having optional nylon scrim 44a bonded thereto via optional adhesive material (preferably, a flame-retardant adhesive material) 46a.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Procedures

Flexibility Test for Laminate Sheet Material

A piece of the laminate sheet material 2.5 cm in width and 15.2 cm in length is wrapped once around the circumference of a 6 millimeter diameter rod (approximately the diameter of a pencil) and unwrapped. The laminate passes this test if it can be wrapped around the rod and unwrapped without a portion of the laminate sheet material exhibiting sufficient cracking and delamination or separation from adjacent layers to allow portions of the laminate to fall away or separate from the laminate construction.

Flexibility Test for Second Layer

A piece of the second layer 2.5 cm in width and 15.2 cm in length is wrapped once around the circumference of a 6 millimeter diameter rod (approximately the diameter of a pencil) and unwrapped. Although cracks may appear and some individual fibers may break, the second layer will pass this test if it does not fall apart, split apart, or disintegrate into smaller portions or individual fibers.

Flammability Test I and Flame Propagation Test I

The Flammability Values I and Flame Propagation Values I of laminate sheet materials were evaluated by placing a sample of the laminate material over a Thermal/Acoustic insulation batt that had been in service in a commercial aircraft and had been removed during routine maintenance operations. The Thermnal/Acoustic insulation batt consisted of a fiberglass insulation material, approximately 2 inches (50 mm) thick, contained within a metallized polyester bag (an insulation batt construction known to have Flammability and Flame Propagation Values that were known not to pass the Flammability and Flame Propagation Test (I or II, according to which testing is being conducted). In all instances the insulation batts were used in the "as removed" from the aircraft condition with no attempts to remove any corrosion inhibitor, hydraulic fluid residues, etc. from the batt.

The following test methods for the Flammability Tests (I and II) and Flame Propagation Tests (I and II) are based on Part II, Department of Transportation, Federal Aviation Administration, Improved Flammability Standards for Thermal/Acoustic Insulation Materials Used in Transport Category Airplanes; Proposed Rule, 14 CFM Part 25, et al., Federal Register, Vol. 65, No. 183, Wednesday, Sep. 20, 2000, pp. 56992–57022, the disclosure of which is incorporated herein by reference.

Figure 5A:
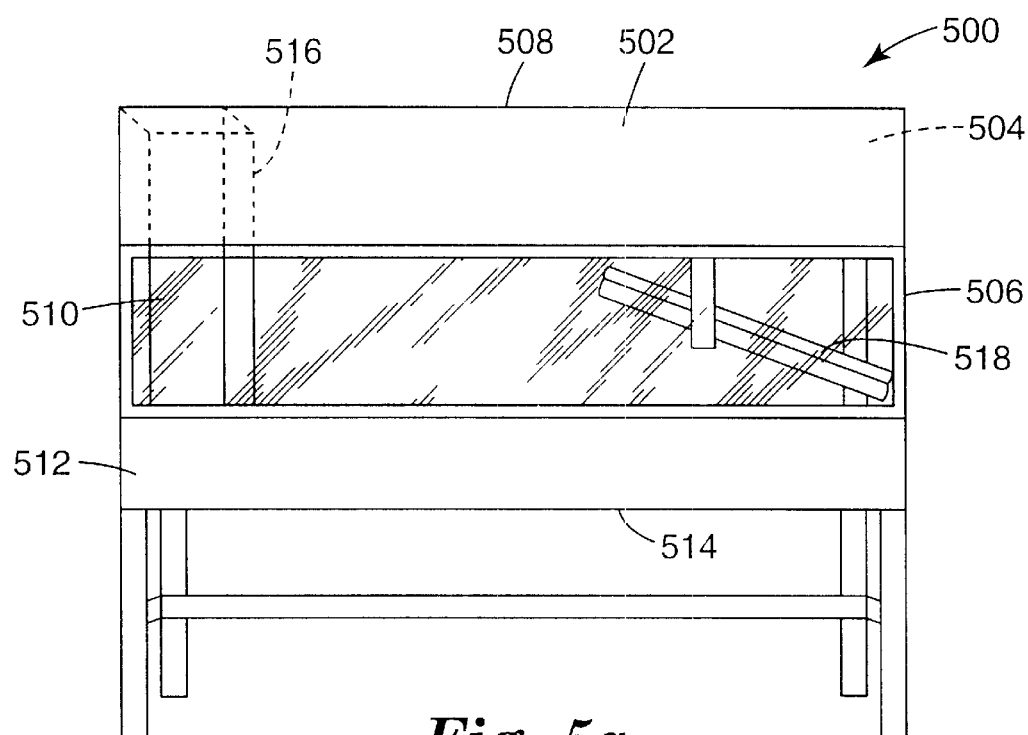
FIG. 5a is a side view schematic representation of the test chamber utilized to evaluate the Flammability and Flame Propagation characteristics of laminate sheet materials according to the present invention.

A schematic of the test apparatus is shown in FIG. 5a. Radiant panel test chamber 500 was located under an exhaust hood to facilitate clearing the chamber of smoke after each test. The radiant panel test chamber consisted of enclosure 502, 55 inches (1400 mm) long by 19.5 (500 mm) deep by 28 (710 mm) above the test specimen. Sides 504, ends 506, and top 508 were insulated with a thermal insulation board (available under the trade designation "KAOWOOL M"). The front side was provided with an approximately 52-by 10-inch (1321 by 254 mm) draft free, high temperature, glass observation window 510, to facilitate viewing the sample during testing. Below the window was door 512, which provided access to the movable specimen platform holder. The bottom of the test chamber consisted of sliding steel platform 514, which had provisions for securing the test specimen holder in a fixed and level position. The chamber also has internal chimney 516 with exterior dimensions of 5.1 inches (129 mm) wide, by 16.2 inches (411 mm) deep by 13 inches (330 mm) high at the opposite end of the chamber from radiant energy source 518. The interior dimensions were 4.5 inches (114 mm) wide by 15.6 inches (395 mm) deep. The chimney extended to the top of chamber 500.

Radiant heat energy source 518 was a panel of porous refractory material mounted in a cast iron frame or equivalent. The panel had a radiation surface of 12 by 18 inches (305 by 457 mm) capable of operating at temperatures up to 1500° F. (816° C.). The radiant panel fuel was propane (liquid petroleum gas—2.1 UN 1075). The panel fuel system consisted of a venturi-type aspirator for mixing gas and air at approximately atmospheric pressure. Instrumentation included an air flow gauge, an air flow regulator, and a gas pressure gauge. The radiant panel was mounted in the chamber at 30° to the horizontal specimen plane.

Sliding platform 514 served as the housing for test specimen placement. Brackets 516 were attached (via wing nuts) to the top lip of the platform in order to accommodate various thicknesses of test specimens. A sheet of refractory material was placed on the bottom of the brackets to hold the test specimen and adjust for height requirement. A ½ inch (13 mm) piece of thermal insulation board ("KAOWOOL M") measuring 41 ½ by 8 ¼ inches (1054 by 210 mm) was attached to the back side of the platform. This board served as a heat retainer and protected the test specimen from excessive preheating.

Figure 5B:
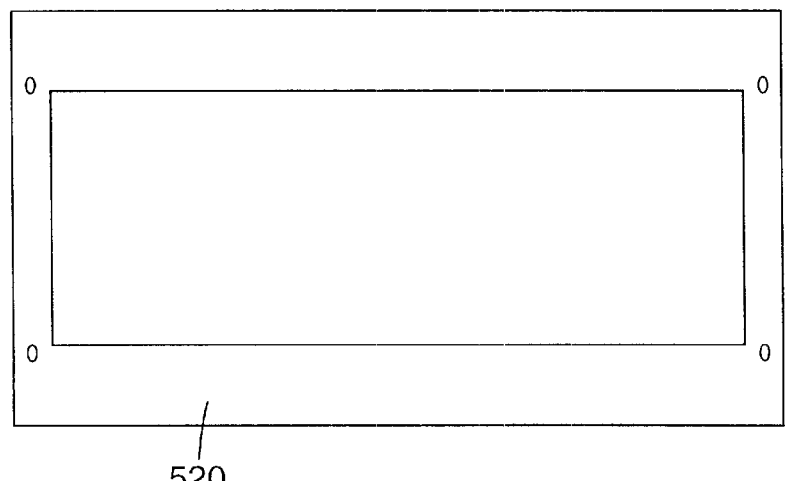
FIG. 5b is a side view schematic illustration of the retaining frame used to hold laminate sheet material according to the present invention in place during Flammability and Flame Propagation testing.
Figure 5C:
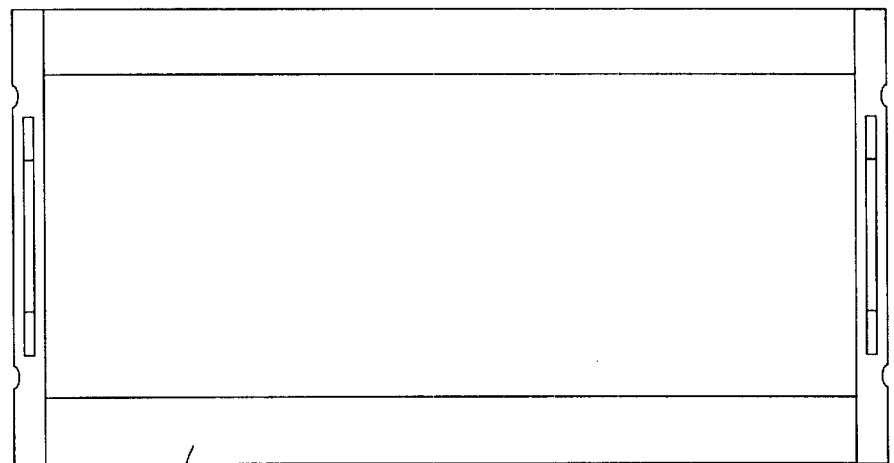
FIG. 5c is a top view schematic illustration of the securing frame that is placed over laminate sheet material according to the present invention and the retaining frame during Flammability and Flame Propagation testing.

The test specimen was placed horizontally on the refractory base and stainless steel retaining frame 520, as shown in FIG. 5b, (AISI Type 300 UNA-NO8330) having a thickness of 0.078 inches (1.98 mm) and overall dimensions of 44 ¾ by 12 ¾ inches is (1137 by 320 mm) with a specimen opening of 40 by 7 ⅞ inches (1016 by 140 mm) placed on top of the test specimen. The retaining frame had two ½ inch (12.7 mm) holes drilled at each end for positioning the frame to the two stud bolts at each end of the sliding platform. A securing frame 522, as shown in FIG. 5c, constructed of mildsteel was placed over the test specimen. The securing frame overall dimensions were 42 ½ by 10 ½ inches (1080 by 267 mm) with a specimen opening of 39 ½ by 7 ½ inches (1003 by 190 mm). It was not necessary to physically fasten the securing frame over the test specimen due to the weight of the frame itself.

Figure 6:
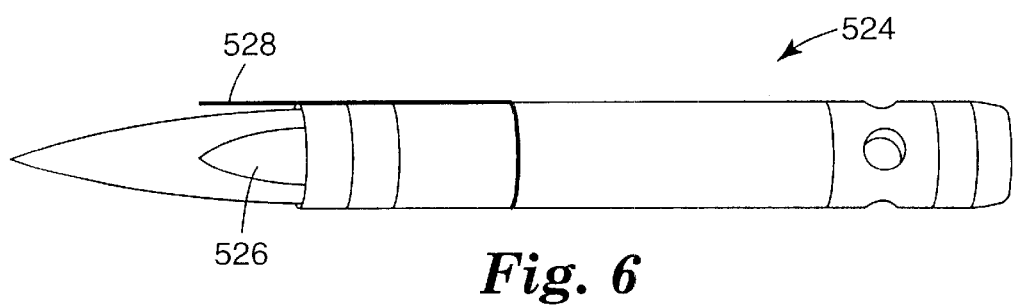
FIG. 6 is a side view schematic illustration of the pilot burner used to ignite laminate sheet material according to the present invention during Flammability and Flame Propagation testing.

Pilot burner 524, as shown in FIG. 6, used to ignite the specimen was a commercial propane venturi torch (available under the trade designation "BERNZOMATIC") with an axially symmetric burner tip having a propane supply tube with an orifice diameter of 0.006 inch (0.15 mm). The length of the burner tube was 2 ⅞ inches (71 mm). The propane flow was adjusted via gas pressure through an in-line regulator to produce a blue inner cone 526 length of ¾ inch (19 mm). A ¾ inch (19 mm) guide 528 (such as a thin strip of metal) was spot welded to the top of the burner to aid in setting the flame height. There was a means provided to move the burner out of the ignition position so that the flame was horizontal and at least 2 inches (50 mm) above the specimen plane.

A 24 American Wire Gauge (AWG) Type K (Chromel-Alumel) thermocouple was installed in the test chamber for temperature monitoring. It was inserted into the chamber through a small hole drilled through the back of the chamber. The thermocouple was placed such that it extended 11 inches (279 mm) out from the back of the chamber wall, 11 ½ inches (292 mm) from the right side of the chamber wall, and was 2 inches (51 mm) below the radiant panel.

The calorimeter was a one inch cylindrical water-cooled, total heat flux density, foil type Gardon Gage that had a range of 0 to 5 $BTU/ft^2$-second (0 to 5.6 $Watts/cm^2$) served as a calorimeter. The calorimeter conformed to the following specifications:

(a) Foil diameter was 0.25±0.005 inches (6.35±0.13 mm).
(b) Foil thickness was 0.0005±0.0001 inches (0.013±0.0025 mm).
(c) Foil material was thermocouple grade Constantan.
(d) Temperature measurement was a Copper Constantan thermocouple.
(e) The copper center wire diameter was 0.0005 inches (0.013 mm).
(f) The entire face of the calorimeter was lightly coated with "Black Velvet" paint having an emissivity of 0.96 or greater.

The calibration method was by comparison to a like standardized transducer.

Figure 7:
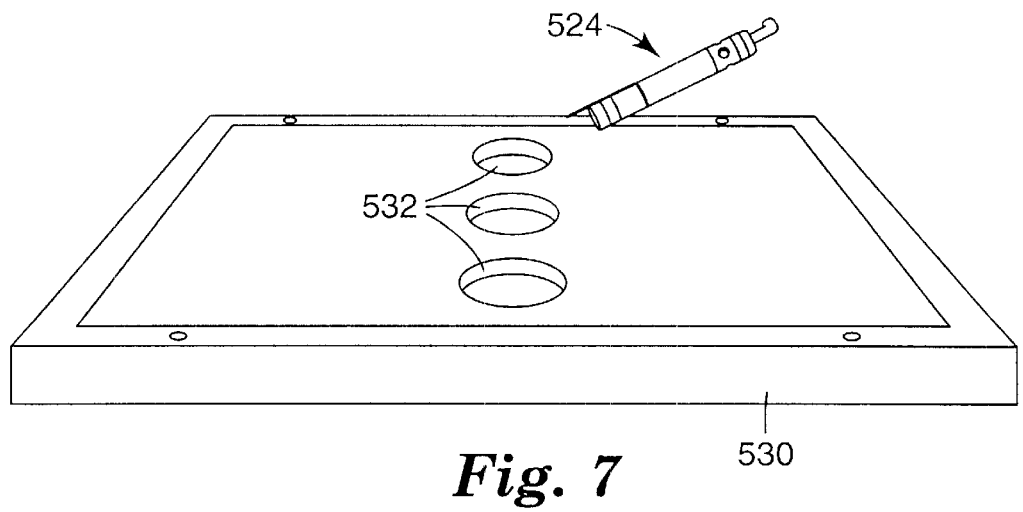
FIG. 7 is a perspective view schematic illustration of the calorimeter holding frame used to position calorimeters during calibration of the Flammability and Flame Propagation test apparatus.

With the sliding platform pulled out of the chamber, calorimeter holding frame 530, as illustrated in FIG. 7, was installed. The frame was 13 ⅛ inches (333 mm) deep (front to back) by 8 inches (203 mm) wide and rested on the top of the sliding platform. It was fabricated of ⅛ inch (3.2 mm) flat stock steel and had an opening that accommodates a ½ inch (12.7 mm) thick piece of thermal insulation board ("KAOWOOL M") board, which was level with the top of the sliding platform. The board had three 1 inch (25.4 mm) diameter holes 530 drilled through the board for calorimeter insertion. The distance from the outside frame (right side) to the centerline of the first hole ("zero" position) was 1 ⅞ inches (47 mm). The distance between the centerline of the first hole to the centerline of the second hole is 2 inches (51 mm). It is also the same distance from the centerline of the second hole to the centerline of the third hole.

A computerized data acquisition system was used to measure and record the outputs of the calorimeter and the thermocouple. The data acquisition system recorded the calorimeter output every second during calibration. A stopwatch, accurate to ±1 second/hour, was used to measure the time of application of the pilot burner flame.

The test results were based on the average of test specimens. Test specimens were constructed from the fire barrier laminate placed on top of 2" thick fiberglass blankets that were removed from existing aircraft. These blankets consisted of two 1" (2.5 cm) layers of fiberglass in an outer bag made from metallized polyester film marketed under the trade designation "ORCON Film AN-33" from Orcon Corporation, Union City, Calif. This film is known to burn. The blankets also included surface contaminants such as corrosion inhibitors, hydraulic fluid, and dirt. A piece of the fire barrier laminate to be tested was cut to 43 inches long (1092 mm) by 11 inches (279 mm) wide and placed over the blanket.

The specimens were conditioned at 70±5° F. (21±2° C.) and 55%±10% relative humidity, for 24 hours prior to testing.

The calorimeter holding frame was installed along with the calorimeter in the first hole ("zero" position). (See FIG. 8). The centerline of the calorimeter was 1 7/8 inches (46 mm) from the end of the holding frame. The distance from the centerline of the calorimeter to the radiant panel surface at this point was 7.5 inches±1/8(191 mm±3). Prior to igniting the radiant panel, the calorimeter face was cleaned and water was running through the calorimeter.

The radiant panel was ignited and the fuel/air mixture was adjusted to achieve 1.5 BTU/ft$^2$-second±5% (1.8 Watts/cm$^2$±5%) at the "zero" position. The unit was allowed to reach steady state (approximately 90 minutes) during which time the pilot burner was off. After steady-state conditions were reached, the calorimeter and calorimeter holder fixture were removed.

Figure 7A:
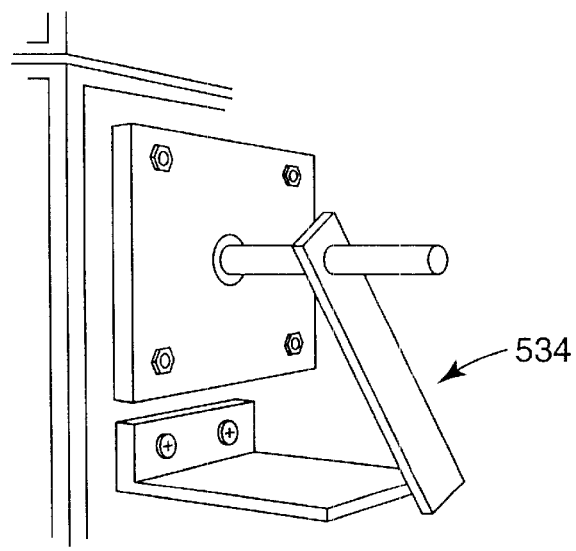
FIG. 7a is a perspective view schematic illustration of the burner stop used to properly position the pilot burner over laminate sheet materials according to the present invention during Flammability and Flame Propagation testing.

The pilot burner was ignited, ensuring that it was at least 2 inches (51 mm) above the top of the platform. The pilot was adjusted so that the blue cone of the flame was 3/4 inch (19 mm) in length. The test specimen was placed in the sliding platform holder, ensuring that the test sample surface was level with the top of the platform. At "zero" point, the specimen surface was 7 1/2 inches±1/8 inch (191 mm±3 mm) below the radiant panel. The retaining frame was placed over the test specimen. The securing frame was also used. The sliding platform was pushed into the chamber to close the bottom door. The pilot burner flame was lowered into contact with the center of the specimen at the "zero" point and simultaneously the timer was started. The pilot burner was at a 27° angle with the sample and was 1/2 inch (12 mm) above the sample. Stop 534, as shown in FIG. 7a, allowed the operator to position the burner in the correct position each time. The burner was left in position for 15 seconds and then removed to a position 2 inches (51 mm) above the specimen.

For the sample to pass the Flame Propagation I (i.e., have a Flame Propagation Value I of zero (0)), no flaming beyond 2 inches (51 mm) to the left of the centerline of the point of pilot flame application must be observed. For the sample to pass the Flammability Test I (i.e., have a Flammability Value I of zero (0)), only 1 of the three test specimens may have an after flame and that after flame may not exceed 3 seconds.

Flammability Test II and Flame Propagation Test II

The Flammability Values II and Flame Propagation Values II of laminate sheet materials can be determined substantially as described in the Flammability Test I and Flame Propagation Test I (described above) except the thermal/acoustic insulation batt is prepared by placing two layers of one inch (2.54 cm) thick fiberglass insulation (available under the trade designation "MICROLITE AA" from Johns Manville, Corp. Denver, Colo.; 43 inches long (1092 mm) by 11 inches (279 mm) wide) between two layers of metallized polyester film (available under the trade designation "INSULFAB 350™" from Facile Holdings, Inc. 45 inches long (1143 mm) by 13 inches (230 mm) wide) and stapling the edges of the resulting laminate together to form a unitized batt.

Burnthrough Test

The following test method was used to evaluate the burn-through resistance characteristics of laminate sheet materials when exposed to a high intensity open flame.

The burnthrough time was measured at the inboard side of each of the laminated sheet material specimens. The burnthrough time was defined as the time required, in seconds, for the burner flame to penetrate the test specimen, and/or the time required for the heat flux to reach 2.0 Btu/ft$^2$-sec (2.3 W/cm$^2$) on the inboard side, at a distance of 12 inches (305 mm) from the front surface of the laminate sheet material test frame, whichever is sooner. A specimen set consisted of one laminate sheet material specimen placed on the burnthrough test rig. The laminate sheet material specimen was positioned on the test rig 540, at an angle of 30° with respect to vertical.

Figure 8:
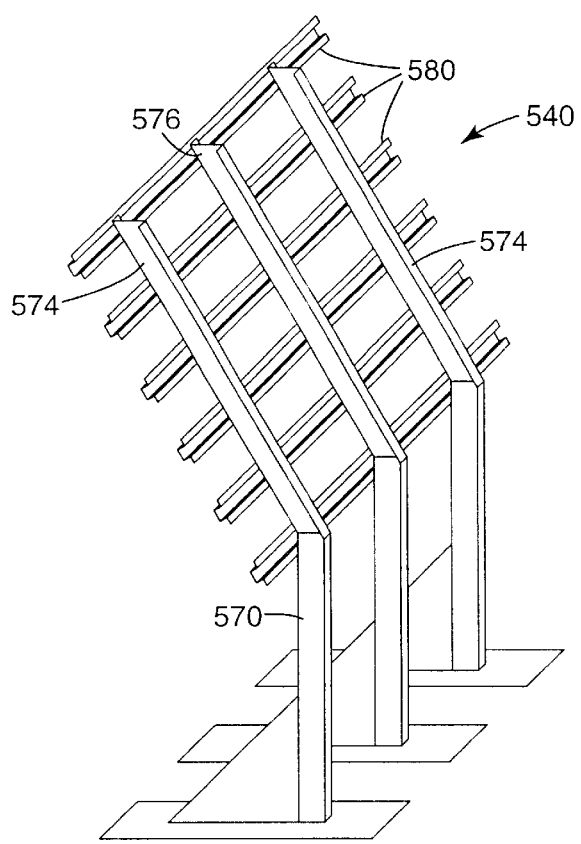
FIG. 8 is a perspective view schematic illustration of the specimen holder used in testing the Burnthrough characteristics of laminate sheet materials according to the present invention.
Figure 9:
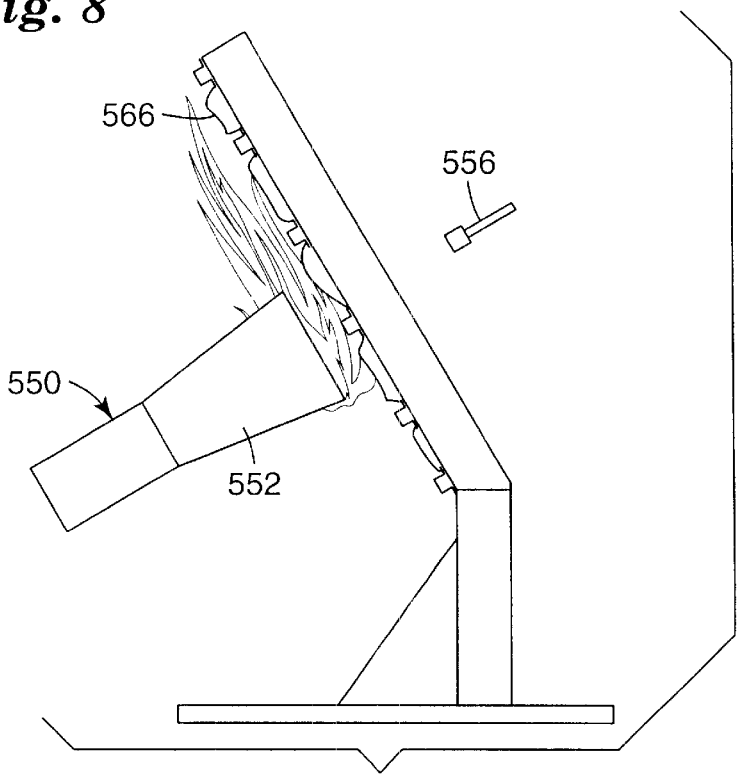
FIG. 9 is a side view schematic illustration of the Burnthrough Test showing laminate sheet material according to the present invention undergoing the Burnthrough test.

The arrangement of the test apparatus is shown in FIGS. 8 and 9 and included swinging the burner away from the test specimen during warm-up. The test burner 550 was a gun-type (available under the trade designation "Park Model DPL 3400") modified per the test procedure description. A nozzle was required to maintain the fuel pressure to yield a nominal 6.0 gal/hr (0.378 L/min) fuel flow. A Monarch manufactured 80° PL hollow cone nozzle nominally rated at 6.0 gal/hr (0.378 L/min) at 100 lb/in$^2$ (0.71 MPa) was used. A 12±0.125-inch (305±6 mm) burner extension cone was installed at the end of the draft tube. The cone had an opening 6±0.125-inch (152±6 mm) high and 11±0.125-inch (280±6 mm) wide. Jet A was used as the fuel.

Figure 11A:
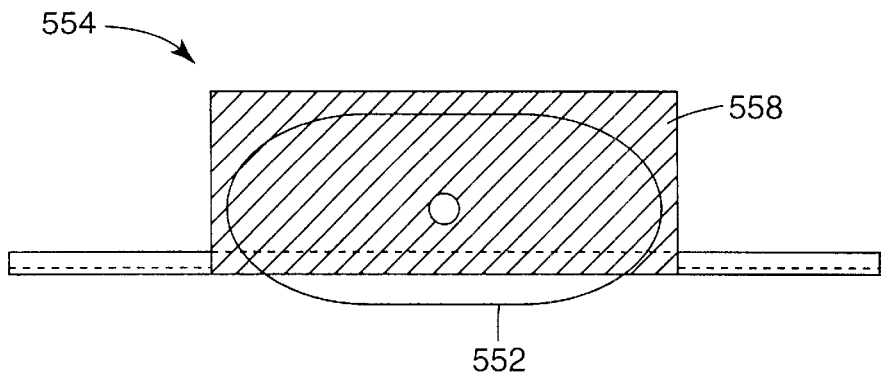
FIGS. 11a and 11b are top and side schematic illustrations, respectively, showing the placement of the calorimeter relative to the burner cone in the Burnthrough Test.
Figure 11B:
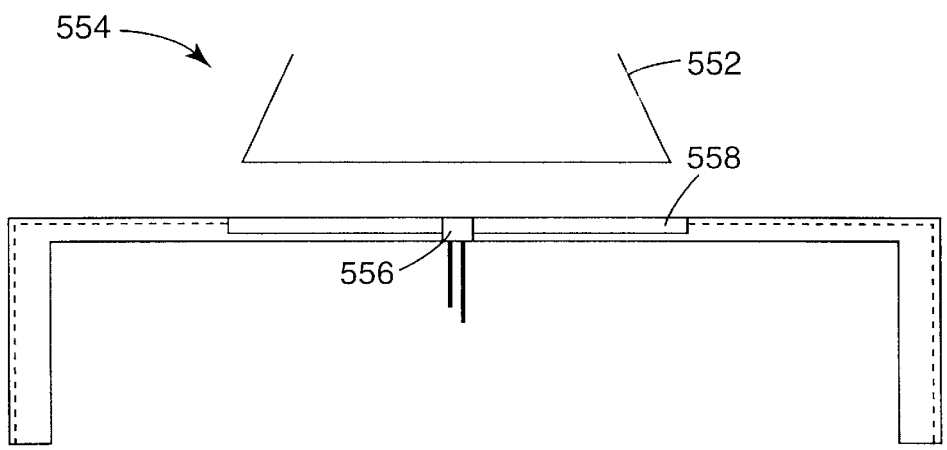

The fuel pressure regulator was adjusted to deliver 6.0 gal/hr (0.378 L/min) at an operating fuel pressure of 100 lb/in$^2$ (0.71 MPa). Calibration rig 554, illustrated in FIGS. 11a and 11b, was constructed to incorporate a calorimeter and thermocouple rake for the measurement of both heat flux and temperature. Calorimeter 556 was a total heat flux, foil type Gardon Gage with a range such as 0–20 Btu/ft$^2$-sec (0–22.7 W/cm$^2$), accurate to ±3% of the indicated reading. The calorimeter was mounted in 12- by 12-±0.125 inch (305 by 305±3 mm) by 0.75±0.125 inch (19 mm±3 mm) thick insulating block 558 attached to calibration rig 556 for attachment to test rig 540 during calibration.

Seven 1/8 inch (3.1 mm) ceramic packed, metal sheathed, type K (Chromel-Alumel), grounded junction thermocouples 560 with a nominal 24 American Wire Gauge (AWG) size conductor were provided for calibration. The thermocouples were attached to steel angle bracket 562 to form thermocouple rake 561 for placement in calibration rig 554 during burner calibration.

A vane-type air velocity meter (available under the trade designation "OMEGA ENGINEERING MODEL HH30A") was used to calibrate the velocity of air entering burner 550. An adapter was used to attach the measuring device to the inlet side of burner 550 to prevent air from entering burner 550 other than through the device.

Mounting frame 570 for test specimens 566 was fabricated of 1/8 inch (3.1 mm) thick steel as shown in FIG. 1. Specimen mounting frame stringers 580 (horizontal) were bolted to test frame formers 574 and 576 (vertical) such that the expansion of the stringers would not cause the entire structure to warp. Mounting frame 570 was used for mounting the laminate sheet material test specimens 566 as shown in FIG. 9. Two total heat flux Gardon type calorimeters 556 were mounted above insulation test specimens 566 on the back side (cold) area of the test specimen mounting frame as shown in FIG. 9. The calorimeters were positioned along the same plane as the burner cone centerline, at a distance of 4 inches (212 mm) from the centerline of the test frame.

A computerized data acquisition system was used to measure and record the outputs of the calorimeters and the thermocouples. A stopwatch, accurate to ±1%, was used to measure the time of application of the burner flame and burnthrough time. Tests were performed at a fire test center (i.e., a test chamber) having a floor area larger than 10 by 10 feet (3.1 by 3.1 meters). The test chamber had an exhausting system capable of removing the products of combustion expelled during tests.

The laminate sheet material specimens were 27 inches (686 mm) wide by 36 inches (914 mm) long. Blanket test specimens 566 were attached to test frame 570 using 12 vise grip welding clamps 572. The clamps were used to hold blankets 566 in place in both of the outer vertical formers 574, as well as center vertical former 576 (4 clamps per former). The top and bottom clamps were placed 6 inches (152 mm) from the top and bottom of the test frame, respectively. The middle clamps were placed 8 inches (203 mm) from the top and bottom clamps.

The frame assembly was leveled and centered to ensure alignment of the calorimeter and thermocouple rake with the burner cone. The ventilation hood for the test chamber was turned on. The burner was turned on while the ignitor remained off. The fuel flow rate was measured using a 2.0 L graduated cylinder and a 4 minute sampling time.

Calibration rig 554 was positioned adjacent to test specimen frame 570. Burner 550 was positioned so that it was centered in front of the calibration rig, and the vertical plane of burner cone 552 exit was at a distance of 4±0.125 inches (102±3 mm) from the calorimeter face. The horizontal centerline of burner cone 552 was offset 1 inch (25.4 mm) below the horizontal centerline of calorimeter 556.

The air velocity meter was positioned in the adapter. The blower/motor was turned on and adjusted such that the air intake velocity was 2150±50 ft/min (655±15 M/min). Burner 550 was rotated from the test position to the warm-up position. While burner 550 is in the warm up position, blower/motor, igniters, and fuel flow were turned on and the burner ignited and allowed it to warm up for a period of 2 minutes. Burner 550 was rotated into the calibration position and allowed 1 minute for calorimeter stabilization, and the heat flux recorded once every second for a period of 30 seconds. Burner 550 was turned off, rotated out of position, and allowed to cool. The average heat flux was calculated over this 30-second duration. The average heat flux was 15.7 Btu/ft$^2$-sec (17.9 W/cm$^2$) which was in the acceptable range of 16.0±0.8BTU/ft$^2$-sec (18.2±0.9 W/cm$^2$).

Figure 12A:
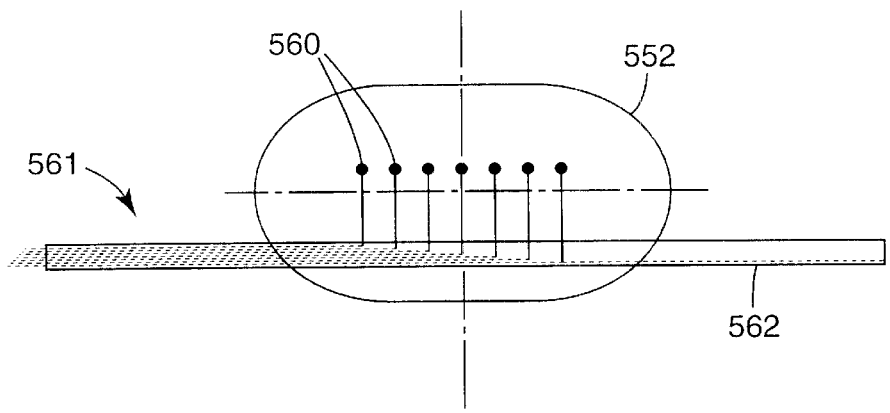
FIGS. 12a and 12b are top and side schematic illustrations, respectively, showing the placement of the thermocouple rake relative to the burner cone in the Burnthrough Test.
Figure 12B:
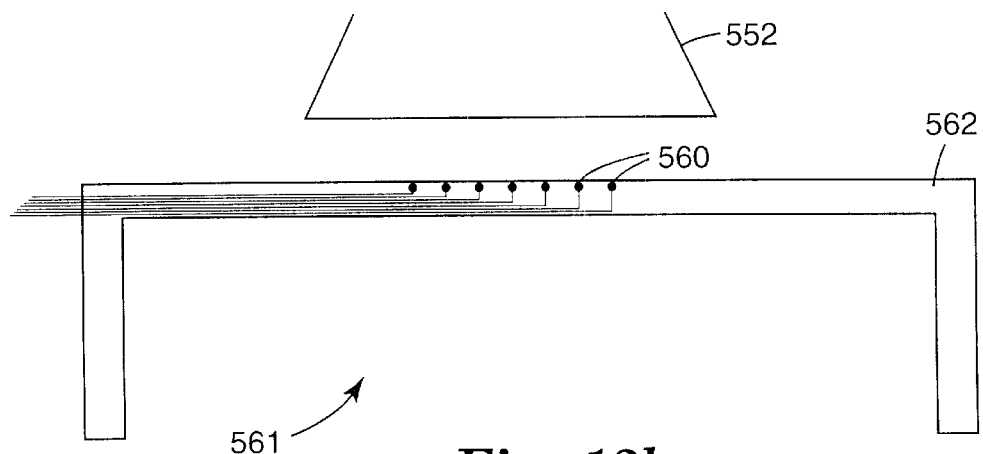

Thermocouple rake 561, illustrated in FIGS. 12a and 12b, was positioned in front of the burner after checking for proper alignment and burner 550 was rotated to the warmup position. The blower/motor, igniters and fuel flow turned on, burner 550 ignited and allowed to warm up for a period of 2 minutes. Burner 550 was rotated into the calibration position and allow 1 minute for thermocouple 560 stabilization, then the temperature of each of the 7 thermocouples 560 recorded once every second for a period of 30 seconds. Burner 550 was turned off, rotated out of position, and allowed to cool. The average temperature of each thermocouple 560 over this 30-second period was within the acceptable range of 1900° F.±100° F. (1038±38° C.).

Figure 9A:
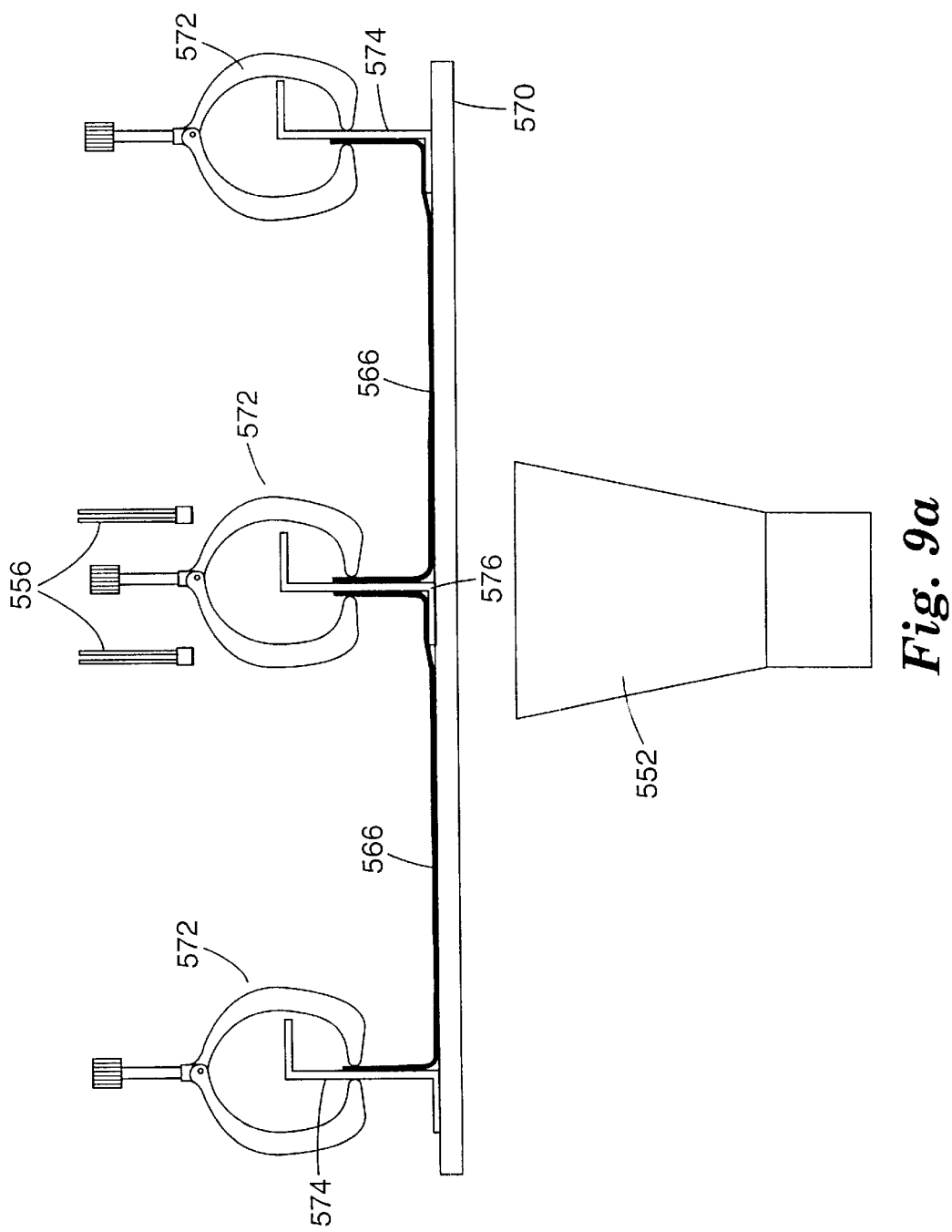
FIG. 9a is a detailed schematic cross-section of the test frame illustrating how laminate sheet material according to the present invention is installed in the test frame prior to Burnthrough testing.
Figure 10A:
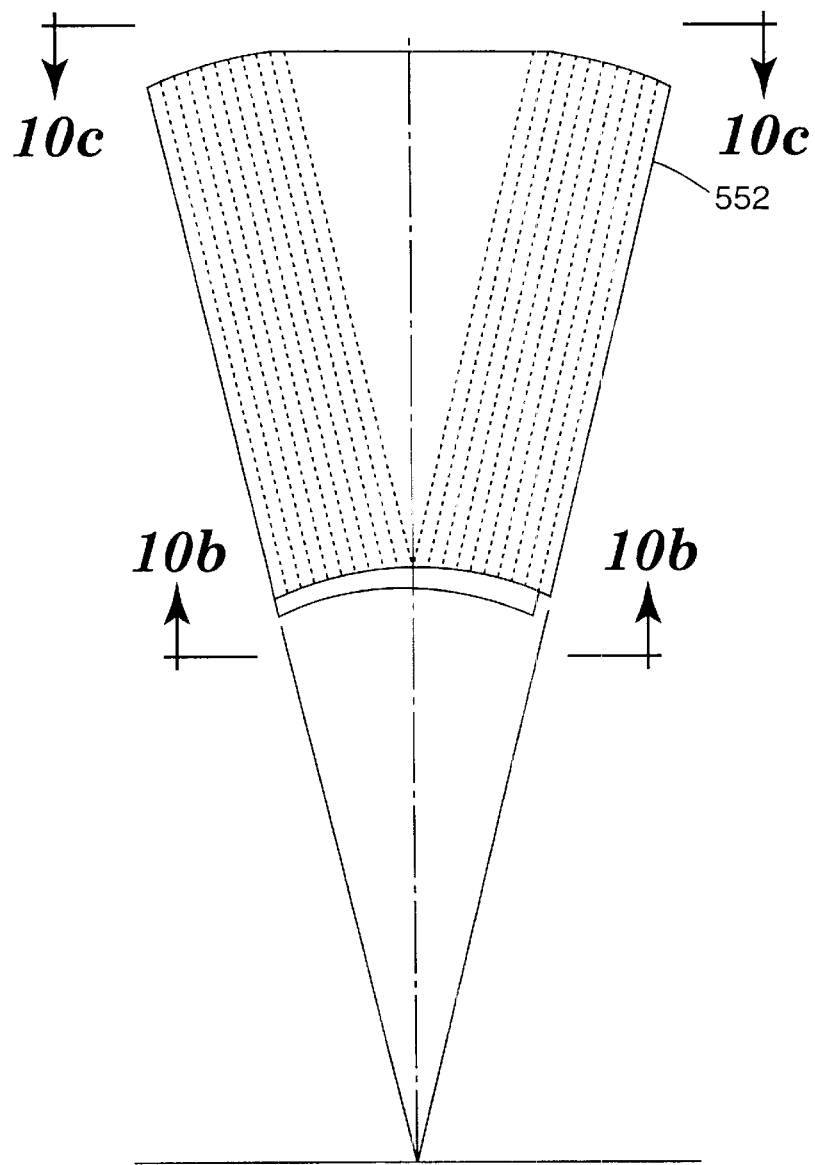
FIG. 10a is a top view schematic illustration of the extension cone that is fitted on the burner during Burnthrough testing.
Figure 10B:
FIG. 10b is an end view of FIG. 10a taken along line 10b—10b after the cone has been formed.
Figure 10C:
FIG. 10c is an end view of FIG. 10a taken along line 10c—10c after the cone has been formed.

Laminate sheet material specimens 566 were secured to the test frame. Laminate sheet material 566 was attached to test rig center vertical former 576 using four welding clamps 572 positioned as shown in FIG. 9a. The vertical plane of the burner cone 552 was at a distance of 4±0.125 inch (102±3.2 mm) from the outer surface of the horizontal stringers of test specimen frame 570, and that burner 550 and test frame 570 were both situated at a 30° angle with respect to vertical. Burner 550 was directed away from the test position to the warm-up position so that the flame did not impinge on the specimens. Burner 550 was ignited and allowed to stabilize for 2 minutes. The test was begun by rotating burner 550 into the test position and simultaneously start the timing device. Test specimens 566 were exposed to the burner flame for 4 minutes and burner 550 turned off. Burner 550 was immediately rotated back to the warm-up position. The burnthrough time, and/or the point at which the heat flux exceeds 2.0 Btu/ft$^2$-sec (2.3 W/cm$^2$) was recorded.

For the sample to pass the Burnthrough Test, laminate sheet material shall resist fire/flame penetration for at least 240 seconds and shall allow no more than 2.0 Btu/ft$^2$-sec (2.3 W/cm$^2$) on the cold side of the insulation specimens at a point 12 inches (301 mm) from the front face of the horizontal stringers of the test rig.

Example 1

An adhesive laminate was prepared by laminating a 50 micrometer thick tackified acrylic, 300R series based fire retardant pressure sensitive adhesive material (available as product number 9373 from the 3M Company, St. Paul, Minn.) to a non-reinforced 25 micrometer thick polyimide film (obtained from E.I. DuPont deNemours & Co., Wilmington, Del. under the trade designation "KAPTON") using a laminator (obtained from Pro-Tech Engineering, Madison, Wis. under the trade designation "ORCA 1") operating at room temperature (i.e., about 25° C.), a pressure of about 2.8 kg/cm$^2$, and a linear speed of about 1.5 m/minute. Two pieces of the resulting adhesive laminate were then used to prepare a three layer laminate sheet material, by laminating one piece to each face of an alumina fiber based fire barrier mat using a laminator ("ORCA 1") operating at room temperature, a pressure of 1.1 kg/cm, and a linear speed of 1.5 m/minute. The mat, which had a basis weight of 80 g/m$^2$ is commercially available from the 3M Company under the trade designation "NEXTEL 312 Flame Stopping Dot Paper".

The resulting laminate sheet material was tested according to the above-defined Flammability Test I and Flame Propagation Test I. The laminate sheet material was placed on top of a thermal/acoustic insulation blanket encased in a metallized polyester film (shown to fail the same test without the fire barrier) to simulate the actual installed configuration in an aircraft. Three test samples showed no flame propagation and exhibited after flame times of 0, 0, and 0 seconds, and thereby had a Flame Propagation Value I and a Flammability Value I which passed the Flammability and Flame Propagation Test I requirements.

The laminate sheet material was also tested according to the above defined Burnthrough Test. The results showed no flame penetration through the specimen for the required 240 seconds, however, the sample exhibit shrinkage that contributed to the heat flux reaching 2.0 BTU/ft$^2$-sec (2.3 W/cm$^2$) at 80 seconds into the test, and hence the sample failed the Burnthrough Test.

Example 2

A three-layer laminate sheet material was prepared substantially as described in Example I except that scrim reinforced polyimide film (obtained from Facile Holdings Inc., under the trade designation "INSULFAB 2000") was substituted for the polyimide film used in Example 1.

The resulting laminate sheet material was tested according to the above-defined Flammability Test I and Flame Propagation Test I. Three test samples showed no flame propagation and exhibited after flame times of 0, 0, and 1 seconds, thereby had a Flame Propagation Value I and a Flammability Value I which passed the Flammability and Flame Propagation Test I requirements.

Example 3

A three-layer laminate sheet material was prepared by thermally laminating a scrim reinforced polyimide film ("INSULFAB 2000") to both faces of a fire barrier mat of mica infiltrated aramid paper (obtained under the trade designation NOMEX 418, 3 mil (75 micrometers) from E.I. duPont deNemours & Co.) using a laminator (ORCA 1) operating at a pressure of 1.1 kg/cm$^2$, a temperature of 113° C., and a linear speed of 1.5 m/minute.

The resulting laminate sheet material was tested according to the above-defined Flammability Test I and Flame Propagation Test I. Three test samples showed no flame propagation and exhibited after flame times of 0, 0, and 0 seconds, which passed the Flammability and Flame Propagation Test I requirements.

The laminate sheet material was also tested according to the above-defined Burnthrough Test. The results showed flame penetration through the specimen in 36 seconds, thereby failing the Burnthrough Test.

Example 4

An aluminoborosilicate fiber based paper (prepared as described in U.S. Pat. No. 5,955,177, (Sanoki et. al.), the disclosure of which is incorporated herein by reference, but not printed with a metal oxide pattern) having a 50 g/m$^2$ basis weight, was infiltrated with a 5.5 wt. dispersion of vermiculite in water (obtained under the trade designation "MICROLITE 963" from W. R. Grace, Cambridge, Mass. The paper was placed on a polyester film, saturated with the vermiculite dispersion and placed in a convection oven operating at 90° C. for approximately 30 minutes to remove the water. The dried paper had a basis weight of 80 g/m$^2$, and was used to prepare the following laminate.

A three-layer laminate sheet material was prepared substantially as described in Example 3 except that the 80 g/m$^2$ vermiculite infiltrated paper was substituted for the mica infiltrated paper. The resulting laminate sheet material was tested according to the above-defined Flammability Test I and Flame Propagation Test I. Three test samples showed no flame propagation and exhibited after flame times of 0, 0, and 0 seconds, which passed the Flammability and Flame Propagation Test I requirements.

The laminate sheet material was also tested according to the above-defined Burnthrough Test described above. The results showed no flame penetration through the specimen for the required 240 seconds and the heat flux peaked at 1.33 BTU/ft$^2$-sec (1.53 W/cm$^2$), below the 2.0 BTU/ft$^2$-sec (2.3 W/cm$^2$) maximum. The sample therefore had a passing Burnthrough Value.

In a further evaluation of the laminate sheet material, the laminate was attached to the Burnthrough test frame with two layers of 6.4 kg/m$^3$ (0.42 pounds/ft$^3$) fiberglass (obtained under the trade designation "MICROLITE AA" available from Johns Manville on the cold side of the laminate (i.e. the side opposite the burner flame) to simulate an installation where the laminate is next to an aircraft fuselage skin and backed up by a typical aircraft insulation blanket. This assembly was tested according to the Burnthrough Test as described above. The results showed no flame penetration through the specimen for the required 240 seconds and the heat flux peaked at 1.21 BTU/ft$^2$-sec (1.39 W/cm$^2$), below the 2.0 BTU/ft$^2$-sec (2.3 W/cm$^2$) maximum. The sample therefore had a passing Burnthrough Value.

Example 5

A three-layer laminate sheet material was prepared substantially as described in Example 1 except that a scrim reinforced polyimide film (25 micrometer polyimide, total thickness of the scrim reinforced film was 75–100 micrometers; obtained under the designation "INSULFAB KP121" from Facile Holdings Inc., Patterson, N.J.) was substituted for the polyimide ("KAPTON") film.

The resulting laminate sheet material was tested according to the above-defined Flammability Test I and Flame Propagation Test I. Three test samples showed no flame propagation and exhibited after flame times of 1, 1, and 2 seconds. The samples therefore had a passing Flame Propagation Value I, and a non-passing Flammability Value I.

The laminate sheet material was also tested according to the above-defined Burnthrough Test. The results showed no flame penetration through the specimen for the required 240 seconds and the heat flux peaked at 1.53 BTU/ft -sec (1.76 W/cm$^2$), below the 2.0 BTU/ft$^2$-sec (2.3 W/cm$^2$) maximum required. The sample therefore had a passing Burnthrough Value.

Example 6

A three-layer laminate sheet material was prepared substantially as described in Example 1 except that a mica infiltrated aramid paper (obtained under the trade designation "NOMEX" 418, (3 mil (75 micrometers) thickness) from E.I. DuPont deNemours & Co.) was substituted for the alumina-based paper.

The resulting laminate sheet material was tested according to the above-defined Flammability Test I and Flame Propagation Test I. Three test samples showed no flame propagation and exhibited after flame times of 1, 1, and 0 seconds. The samples therefore had a passing Flame Propagation Value I and a non-passing Flammability Value I.

Example 7

An aluminoborosilicate fiber-based paper (prepared as described in U.S. Pat. No. 5,955,177 (Sanoki et. al.), the disclosure of which is incorporated herein by reference, but not printed with the metal oxide pattern) having a 50 g/m$^2$ basis weight, was infiltrated an with a 5.5 wt. % dispersion of vermiculite in water ("MICROLITE 963") substantially as described in Example 4 except that the dried infiltrated paper had a basis weight of 100 g/m$^2$. A three-layer laminate sheet material,was prepared substantially as described in Example 6 except that the 100 g/m$^2$ vermiculite infiltrated paper was used in place of the 80 g/m$^2$ vermiculite infiltrated paper.

The resulting laminate sheet material was tested according to the above-defined Flammability Test I and Flame Propagation Test I. Three test samples showed no flame propagation and exhibited after flame times of 6, 6, and 5 seconds. The samples therefore had a passing Flame Propagation Value I and a non-passing Flammability Value I.

Example 8

An alumina fiber-based fire barrier mat ("NEXTEL 312 Flame Stopping Dot Paper") paper having a basis weight of 80 g/m$^2$ (available from the 3M Company) was infiltrated with a 5.5 wt.% dispersion of vermiculite in water ("MICROLITE 963") substantially as described in Example 6 except that the dried paper had a basis weight of 110 g/m². A three-layer laminate sheet material was prepared substantially as described in Example 6 except that the 110 g/m² vermiculite infiltrated mat ("NEXTEL 312 Flame Stopping Dot Paper") was used in place of the 80 g/m² vermiculite infiltrated paper.

The resulting laminate sheet material was tested according to the above-defined Flammability Test I and Flame Propagation Test I. Three test samples showed no flame propagation and exhibited after flame times of 0, 6, and 2 seconds. The samples therefore had passing Flame Propagation Value I and a non-passing Flammability Value I.

Various modifications and alterations of this invention will become apparent to those skilled in the art without departing from the scope and spirit of this invention, and it should be understood that this invention is not to be unduly limited to the illustrative embodiments set forth herein.

It is claimed:

1. A flexible laminate sheet material comprising:

a first layer comprised of a film of high temperature stable polymeric material, wherein the high temperature stable polymeric material is stable at a temperature of about 150° C.; and adhesively bonded to the first layer by a flame-retardant adhesive material a second layer comprised of a fabric of non-metallic fibers;

wherein the average thickness of the laminate sheet material range from about 75 to about 1200 micrometers;

wherein the laminate sheet material retains its integrity when the laminate sheet material is wrapped once around a 6 millimeter diameter rod and then unwrapped;

wherein at least the first and second layers collectively contribute to the laminate sheet material having at least one of a passing Flammability Value I, a passing Flammability Value II, a passing Flame Propagation Value I, a passing Flame Propagation Value II, or a passing Burnthrough Value.

2. The laminate sheet material of claim 1 wherein at least the first and second layers collectively contribute to the laminate sheet material having at least one of a passing Flammability Value I or a passing Flammability Value II.

3. The laminate sheet material of claim 1 wherein the first and second layers are sufficient to collectively provide at least one of a passing Flammability Value I or a passing Flammability Value II.

4. The laminate sheet material of claim 1 wherein at least the first and second layers collectively contribute to the laminate sheet material having at least one of a passing Flame Propagation Value I or a passing Flame Propagation Value II.

5. The laminate sheet material of claim 1 wherein the first and second layers are sufficient to collectively provide at least one of a passing Flame Propagation Value I or a passing Flame Propagation Value II.

6. The laminate sheet material of claim 1 wherein at least the first and second layers collectively contribute to the laminate sheet material having a passing Burnthrough Value.

7. The laminate sheet material of claim 1 wherein the first and second layers are sufficient to collectively provide a passing Burnthrough Value.

8. The laminate sheet material of claim 1 wherein at least the first and second layers collectively contribute to the laminate sheet material having (a) at least one of a passing Flammability Value I or a passing Flammability Value II and (b) at least one of a passing Flame Propagation Value I or a passing Flame Propagation Value II.

9. The laminate sheet material of claim 1 wherein the first and second layers are sufficient to collectively provide (a) at least one of a passing Flammability Value I or a passing Flammability Value II and (b) at least one of a passing Flame Propagation Value I or a passing Flame Propagation Value II.

10. The laminate sheet material of claim 1 wherein at least the first and second layers collectively contribute to the laminate sheet material having (a) at least one of a passing Flammability Value I or a passing Flammability Value II and (b) a passing Burnthrough Value.

11. The laminate sheet material of claim 1 wherein the first and second layers are sufficient to collectively provide (a) at least one of a passing Flammability Value I or a passing Flammability Value II and (b) a passing Burnthrough Value.

12. The laminate sheet material of claim 1 wherein at least the first and second layers collectively contribute to the laminate sheet material having (a) at least one of a passing Flame Propagation Value I or a passing Flame Propagation Value II and (b) a passing Burnthrough Value.

13. The laminate sheet material of claim 1 wherein the first and second layers are sufficient to collectively provide (a) at least one of a passing Flame Propagation Value I or a passing Flame Propagation Value II and (b) a passing Burnthrough Value.

14. The laminate sheet material of claim 1 wherein at least the first and second layers collectively contribute to the laminate sheet material having (a) at least one of a passing Flammability Value I or a passing Flammability Value II, (b) at least one of a passing Flame Propagation Value I or a passing Flame Propagation Value II, and (c) a passing Burnthrough Value.

15. The laminate sheet material of claim 1 wherein the first and second layers are sufficient to collectively provide (a) at least one of a passing Flammability Value I or a passing Flammability Value II, (b) at least one of a passing Flame Propagation Value I or a passing Flame Propagation Value II, and (c) the passing Burnthrough Value.

16. The laminate sheet material of claim 1 wherein the first layer is a fluid barrier.

17. The laminate sheet material of claim 1 having a weight of less than about 500 grams per square meter.

18. The laminate sheet material of claim 1 having a weight of less than about 400 grams per square meter.

19. The laminate sheet material a of claim 1 having a weight of less than about 350 grams per square meter.

20. The laminate sheet material of claim 1 further comprising a scrim.

21. The laminate sheet material of claim 1 wherein the first layer is coextensively bonded to the second layer.

22. The laminate sheet material of claim 1 wherein the polymeric material is selected from the group consisting of polyamides, polyvinyl fluorides, silicone resins, polyimides, polytetrafluoroethylenes, polyesters, polyaryl sulfones, polyetheretherketones, polyester amides, polyester imides, polyethersulfones, polyphenylene sulfides and combinations thereof.

23. The laminate sheet material of claim 1 further comprising a third layer comprised of polymeric material, wherein the second layer is positioned between the first layer and the third layer.

24. The laminate sheet material of claim 1 wherein the average thickness of the laminate sheet material ranges from about 125 to about 625 micrometers.

25. The laminate sheet material of claim 1 wherein the average thickness of the laminate sheet material ranges from about 200 to about 450 micrometers.

26. The laminate sheet material of claim 1 which further comprises a material comprising a metal oxide secured to at least a portion of the second layer.

27. The laminate sheet material of claim 26 wherein the second layer has a first and second major surface and wherein the metal oxide is in the form of a coating and present on only a portion of at least one of the major surfaces of the second layer.

28. The laminate sheet material of claim 27 wherein the metal oxide is arranged in a plurality of islands on the second layer and wherein the plurality of islands have a total surface area of about 5% to about 25%, based on the total surface area of the major surfaces having the metal oxide coating thereon.

29. The laminate sheet material of claim 27 wherein the second layer comprises a nonwoven fabric and the nonwoven fabric comprises at least about 10% by weight of the non-metallic fibers that are at least about 5 millimeters in length; and wherein the metal oxide covers about 5% to about 25% of the total surface area of the major surfaces having the metal oxide coating thereon.

30. The laminate sheet material of claim 27 wherein the second layer comprises a nonwoven fabric and the fabric includes an amount of non-metallic fibers at least about 5 millimeter in length and the fabric includes an amount and arrangement of the metal oxide coating, both of which are sufficient to retain the integrity of the fabric when it is wrapped once around a 6 millimeter diameter rod and then unwrapped.

31. The laminate sheet material of claim 26 further comprising inorganic oxide platelets secured to at least a portion of the second layer.

32. The laminate sheet material of claim 26 further comprising platelets selected from the group consisting of mica platelets, clay platelets, vermiculite platelets, talc platelets and combinations thereof secured to at least a portion of the second layer.

33. The laminate sheet material of claim 1 further comprising platelets secured to at least a portion of the second layer.

34. The laminate sheet material of claim 1 further comprising platelets selected from the group consisting of mica platelets, clay platelets, vermiculite platelets, talc platelets and combinations thereof secured to at least a portion of the second layer.

35. The laminate sheet material of claim 1 wherein non-metallic fibers that the second layer comprises are selected from the group consisting of glass fibers, aramid fibers, crystalline ceramic oxide fibers, silicon nitride fibers, silicon carbide fibers, oxidized polyacrylonitrile fibers, and combinations thereof.

36. The laminate sheet material of claim 1 wherein the second layer comprises a fabric material selected from the group consisting of woven, knitted, and nonwoven fabric materials.

37. A vehicle comprising insulation material and the laminate sheet material of claim 1, wherein the laminate sheet material and the insulation material are positioned such that the first layer of the laminate sheet material is positioned adjacent to the insulation material.

38. The vehicle of claim 37 wherein the insulation material is flammable.

39. The vehicle of claim 37 wherein the insulation material is nonflammable.

40. An aircraft comprising insulation material, electrical wiring, and the laminate sheet material of claim 1, wherein the laminate sheet material is positioned between the insulation material and electrical wiring, and wherein the first layer of the laminate sheet material is adjacent to the insulation material.

41. The aircraft of claim 40 wherein the insulation material is flammable.

42. The aircraft of claim 40 wherein the insulation material is nonflammable.

43. An aircraft comprising insulation material, a fuselage exterior skin, and the laminate sheet material of claim 1, wherein the laminate sheet material is positioned between the insulation material and the fuselage exterior skin, and wherein the first layer of the laminate sheet material is adjacent to the insulation material.

44. The aircraft of claim 43 wherein the insulation material is flammable.

45. The aircraft of claim 43 wherein the insulation material is nonflammable.

46. A system for limiting exposure of flammable insulation material to an ignition source comprising:
   a flexible laminate sheet material comprising:
      a first layer comprised of a film of high temperature stable polymeric material, wherein the high temperature stable polymeric material is stable at a temperature of about 150° C.; and
      adhesively bonded to the first layer by a flame-retardant adhesive material a second layer comprised of a fabric of non-metallic fibers;
      wherein the average thickness of the laminate sheet material ranges from about 75 to about 1200 micrometer;
      wherein the laminate sheet material retains its integrity when the laminate sheet material is wrapped once around 6 millimeter diameter rod and then unwrapped;
      wherein at least the first and second layers collectively contribute to the laminate sheet material having at least one of a passing Flammability Value I, a passing Flammability Value II, a passing Flame Propagation Value I, a passing Flame Propagation Value II, or a passing, Burnthrough Value;
   wherein the laminate sheet material is positioned between the flammable insulation material and the ignition source such that the first layer of the laminate sheet material is adjacent to the flammable insulation material.

47. An insulation system comprising:
   flexible laminate sheet material comprising:
   a first layer comprised of a film of high temperature stable polymeric material, wherein the high temperature stable polymeric material is stable at a temperature of about 150° C.; and
   adhesively bonded to the first layer by a flame-retardant adhesive material a second layer comprised of a fabric of non-metallic fibers;
   wherein the average thickness of the laminate sheet material ranges from about 75 to about 1200 micrometers;
   wherein the laminate sheet material retains its integrity when the laminate sheet material is wrapped once around a 6 millimeter diameter rod and then unwrapped;
   wherein al least the first and second layers collectively contribute to the laminate sheet material having at least one of a passing Flammability Value I, a passing Flammability Value II, a poising Flame Propagation Value I, a passing Flame Propagation Value II or a passing Burnthrough Value; and insulation material;

wherein the laminate sheet material and the insulation material are positioned such that the first layer of the laminate sheet material is adjacent to the insulation material.

48. The insulation system of claim 47 wherein the insulation material is flammable.

49. The insulation system of claim 47 wherein the insulation material is nonflammable.

50. An insulation blanket comprised of:

a flexible laminate sheet material comprising:

a first layer comprised of a film of high temperature stable polymeric material, wherein the high temperature stable polymeric material is stable at a temperature of about 150° C.; and adhesively bonded to the first layer by a flame-retardant adhesive material a second layer comprised of a fabric of non-metallic fibers;

wherein the average thickness of the laminate sheet material ranges from about 75 to about 1200 micrometers;

wherein the laminate sheet material retains its integrity when the laminate sheet material is wrapped once around a 6 millimeter diameter rod and then unwrapped;

wherein at least the first and second layers collectively contribute to the laminate sheet material having at least one of a passing Flammability Value I, a passing Flammability Value II, a passing Flame Propagation Value I, a passing Flame Propagation Value II, or a passing Burnthrough Value; and insulation material;

wherein the laminate sheet material and the insulation material are positioned such that the first layer of the laminate sheet material is positioned adjacent to the insulation material.

51. The insulation blanket of claim 50, wherein the insulation material is flammable.

52. The insulation blanket of claim 50, wherein the insulation material is nonflammable.

53. The laminate sheet material of claim 1 further comprising a third layer comprised of a film of high temperature stable polymeric material and a scrim, wherein the second layer is positioned between the first layer and the third layer;

wherein the first layer further comprises said film of high temperature stable polymeric material and a scrim;

wherein the first layer and the second layer are bonded together via flame-retardant adhesive material; and wherein the third layer and the second layer are bonded together via flame-retardant adhesive material.

* * * * *

UNITED STATES PATENT AND TRADEMARK OFFICE
CERTIFICATE OF CORRECTION

PATENT NO. : 6,670,291 B1
DATED : December 30, 2003
INVENTOR(S) : Tompkins, Thomas L.

It is certified that error appears in the above-identified patent and that said Letters Patent is hereby corrected as shown below:

Column 1,
Line 42, "1999." should read -- 1999, --
Line 42, "The disclosure" should read -- the disclosure --

Column 2,
Line 17, "Value l," should read -- Value ll, --

Column 3,
Line 1, "Valur H" should read -- Value ll --

Column 10,
Line 60, "3000 C" should read -- 300°C --

Column 18,
Line 16, "41 a" should read -- 41a --

Column 23,
Line 54, "allow" should read -- allowed --.

Column 30,
Line 33, "micrometer;" should read -- micrometers; --
Line 66, "al" should read -- at --

Signed and Sealed this

Sixth Day of July, 2004

JON W. DUDAS
*Acting Director of the United States Patent and Trademark Office*